United States Patent
Trezza et al.

(10) Patent No.: US 6,773,166 B2
(45) Date of Patent: Aug. 10, 2004

(54) MULTI-PIECE FIBER OPTIC COMPONENT AND MANUFACTURING TECHNIQUE

(75) Inventors: John Trezza, Nashua, NH (US); Greg Dudoff, Amherst, NH (US); Keith Kang, Hollis, NH (US); Ronald Olson, Amherst, NH (US)

(73) Assignee: Xanoptix, Inc., Merrimack, NH (US)

( * ) Notice: Subject to any disclaimer, the term of this patent is extended or adjusted under 35 U.S.C. 154(b) by 269 days.

(21) Appl. No.: 09/896,664

(22) Filed: Jun. 29, 2001

(65) Prior Publication Data

US 2003/0002803 A1 Jan. 2, 2003

(51) Int. Cl.[7] ................................................. G02B 6/36
(52) U.S. Cl. .............................. 385/53; 385/59; 385/71
(58) Field of Search ............................. 385/53, 59, 65, 385/66, 71, 137

(56) References Cited

U.S. PATENT DOCUMENTS

| | | |
|---|---|---|
| 3,825,318 A | 7/1974 | Croset et al. |
| 4,230,385 A | 10/1980 | Ammon et al. |
| 4,744,627 A | 5/1988 | Chande et al. |
| 4,966,432 A | 10/1990 | Okada et al. |
| 5,175,928 A | 1/1993 | Grabbe .......................... 29/884 |
| 5,214,730 A | 5/1993 | Nagasawa et al. |
| 5,241,612 A * | 8/1993 | Iwama .......................... 385/74 |

(List continued on next page.)

OTHER PUBLICATIONS

Basavanhally, N.R. et al., "Optoelectronic Packaging of Two–Dimensional Surface Active Devices", *IEEE Transactions On Components, Packaging, And Manufacturing Technology—Part B*, vol. 19, No. 1, pp. 107–114, 1996.

Boisset, G.C. et al., "On–Die Diffractive Alignment Structures for Packaging of Microlens Arrays with 2–D Optoelectronic Device Arrays", *IEEE Photonics Technology Letters*, vol. 8, No. 7, pp. 918–920, Jul. 1996.

(List continued on next page.)

*Primary Examiner*—Hae Moon Hyeon
(74) *Attorney, Agent, or Firm*—Morgan & Finnegan LLP

(57) ABSTRACT

A commercial fiber optic connector of a style constructed to accept a ferrule-like unit therein has optical fibers, each having a first part and a second part separated by lengths, a low precision piece having a peripheral shape of a part of the ferrule like unit, two high precision slices each having fiber holes therein. A chamber separates the two high precision pieces defining a volume therebetween. The optical fibers have their first parts within the fiber holes in one of the high precision slices, their second parts within the fiber holes in the other of the high precision slices, and at least some of their length within the volume. The low precision piece and the two high precision slices collectively form the ferrule like unit and the ferrule like unit is contained substantially within the connector housing.

A method of making a commercial optical connector involves making a first plate having holes, each larger than a cross sectional area of an optical fiber; making a second plate having holes each larger than the cross sectional area of the optical fiber; inserting an optical fiber in one of the holes in the first plate and one of the holes in the second plate, forming a ferrule component by connecting each of the first plate and the second plate to a chamber that separates the first plate from the second plate, and inserting the ferrule component in a ferrule location of the commercial optical connector.

27 Claims, 20 Drawing Sheets

U.S. PATENT DOCUMENTS

| | | | |
|---|---|---|---|
| 5,259,052 A | 11/1993 | Briggs et al. | |
| 5,379,361 A | 1/1995 | Maekawa et al. | 385/65 |
| 5,400,429 A | 3/1995 | Ames et al. | |
| 5,446,815 A * | 8/1995 | Ota et al. | 385/33 |
| 5,473,716 A | 12/1995 | Lebby et al. | 385/54 |
| 5,548,675 A * | 8/1996 | Shigematsu et al. | 385/80 |
| 5,550,942 A * | 8/1996 | Sheem | 385/53 |
| 5,579,426 A | 11/1996 | Li et al. | 385/88 |
| 5,613,024 A | 3/1997 | Shahid | |
| 5,664,039 A | 9/1997 | Grinderslev et al. | 385/65 |
| 5,671,311 A | 9/1997 | Stillie et al. | |
| 5,743,785 A | 4/1998 | Lundberg et al. | |
| 5,761,350 A | 6/1998 | Koh | 385/14 |
| 5,815,621 A * | 9/1998 | Sakai et al. | 385/80 |
| 5,853,626 A | 12/1998 | Kato | |
| 6,012,856 A | 1/2000 | Kim et al. | |
| 6,174,424 B1 | 1/2001 | Wach et al. | 205/73 |
| 6,238,100 B1 * | 5/2001 | Sasaki et al. | 385/59 |
| 6,246,813 B1 | 6/2001 | Zheng | |
| 6,292,529 B1 | 9/2001 | Marcovici et al. | 378/19 |
| 6,324,316 B1 | 11/2001 | Fouquet et al. | |
| 6,328,482 B1 | 12/2001 | Jian | 385/88 |
| 6,379,053 B1 | 4/2002 | van Doorn | |
| 6,442,306 B1 | 8/2002 | Dautartas et al. | |
| 6,496,624 B1 * | 12/2002 | Hikita et al. | 385/50 |
| 2001/0051026 A1 | 12/2001 | Steinberg et al. | 385/78 |
| 2002/0131752 A1 * | 9/2002 | Boudreau et al. | 385/137 |
| 2002/0197047 A1 * | 12/2002 | Basavanhally et al. | 385/137 |

OTHER PUBLICATIONS

Cryan, C.V., "Two–dimensional multimode fibre array for optical interconnects", IEEE Electronic Letters Online No. 19980073, Oct. 23, 1997.

Giboney, K.S., "Parallel–Optical Interconnect Development at HP Laboratories", SPIE, vol. 3005, pp. 193–201, Feb. 1997.

Hall, J.P. et al., "Packaging of VCSEL, MC–LED and Detector 2–D Arrays", Electronic Components and Technology Conference, pp. 778–782, 1998.

Hayashi T. and Tsunetsugu H, "Optical Module with MU Connector Interface Using Self–alignment Technique by Solder–bump Chip Bonding", Electronic Components and Technology Conference, p. 13–19, 1996.

Ishida, H. et al., "Two–dimensionally arranged 24–fiber optical connectors", OFC '97 Technical Digest, pp. 189–190, 1997.

Jöhnck M. et al., "*X* Pof Based Interchip Interconnection with 2.5 Gbit/s Per Channel Data Transmission", ECOC '98, pp. 35 and 36, Sep. 20–24, 1998.

Koyabu, K. et al., "Fabrication of Two–Dimensonal Fiber Arrays Using Microferrules", IEEE, pp. 11–19, 1998.

Lee, S.S., et al., "Self–Aligned Integration of 8 ×1 Micromachined Micro–Fresnel Lens Array and 8 ×1 Vertical Cavity Surface Emitting Laser Arrays For Free–Space Optical Interconnect", IEEE, pp. 31.2.1–31.2.4, 1994.

Liu, Yongsheng et al., "Design, implementation, and characterization of a hybrid optical interconnect for a four–stage free–space optical backplane demonstrator", Applied Optics, vol. 37, No. 14, pp. 2895–2911, May 10, 1998.

Maj, T. et al., "Interconnection of a two–dimensional array of vertical–cavity surface–emitting lasers to a receiver array by means of a fiber image guide", Applied Optics, vol. 39, No. 5, pp. 683–689, Feb. 10, 2000.

McCormick, F.B., "Smart Pixel Optics and Packaging", IEEE/LEOS Summer Topical Meeting: Smart Pickels, pp. 45 and 46, Aug. 1996.

Ohki, A. et al., "Multi–channel optical coupling between VCSEL arrays and multimode optical fibers for a 40–channel paralel optical interconnection module", IEEE, pp. 47 and 48, 1998.

Sasian, J. et al., "Fabrication of fiber bundle arrays for free–space photonic switching systems", Optical Engineer, vol. 33, No. 9, pp. 2979–2985, Sep. 1994.

Söchtig, J. et al., "Replicated Plastic Optical Components for Optical Micro Systems", IEEE, pp. 37 and 38, 1998.

Tooley, F., "Challenges in Optically Interconnecting Electronics", IEEE Journal Of Selected Topics In Quantum Electronics, vol. 2, No. 1, pp. 3–13, Apr. 1996.

International Search Report dated Dec. 13, 2002.

International Search Report dated Dec. 17, 2002.

International Search Report dated Dec. 20, 2002.

International Search Report dated Jan. 02, 2003.

International Search Report dated Jan. 03, 2003.

G. Proudley, et al., "Fabrication of two dimensional fiber optic arrays for an optical crossbar switch," Optical Engineering, vol. 33, #2, pp. 627–635, Feb. 1994.

Kosaka, M. et al., "Plastic–Based Receptacle–Type VCSEL–Array modules with One and Two Dimensions Fabricated using the self–Alignment Mounting Technique," IEEE Electronic Components and Technology Conference, pp. 382–390 (1997).

* cited by examiner

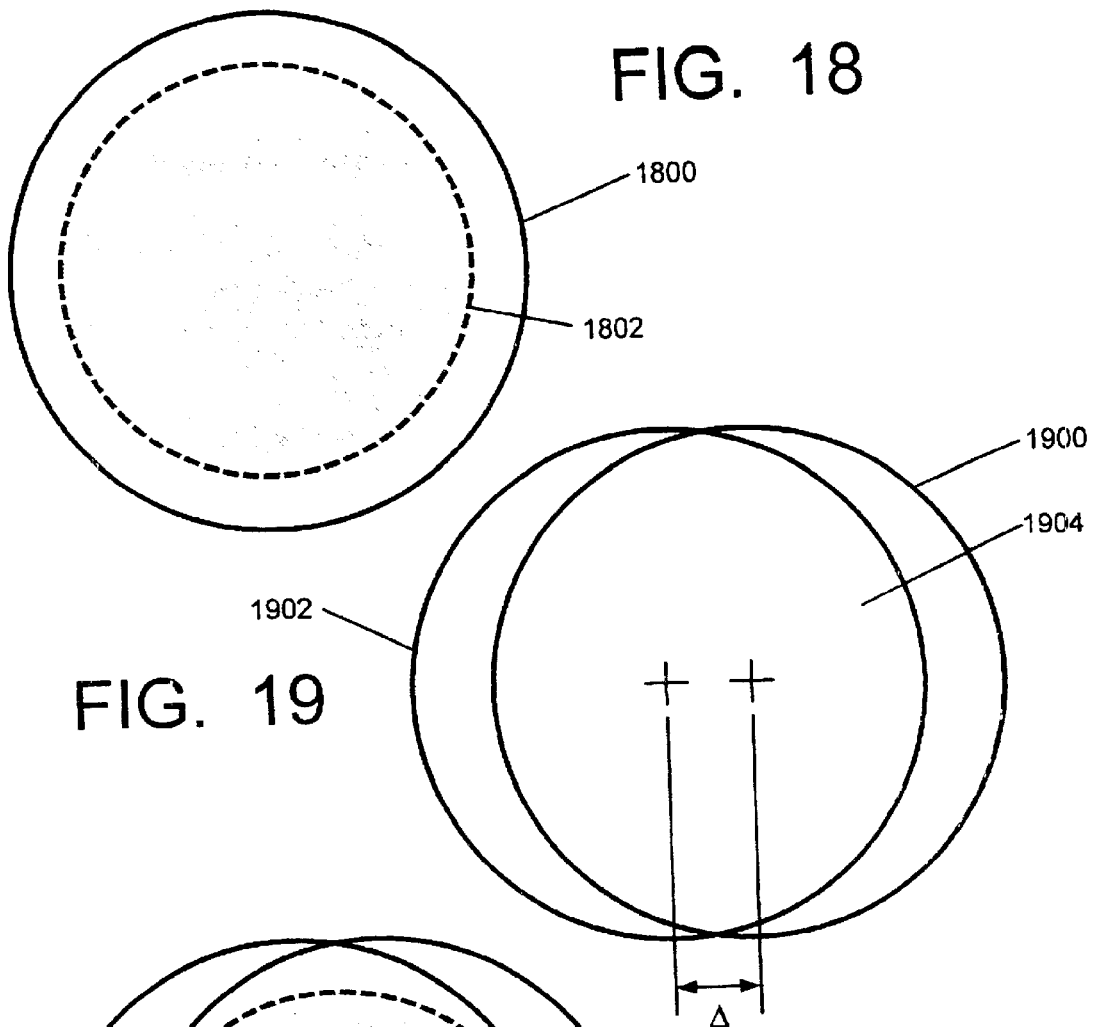
FIG. 18
FIG. 19
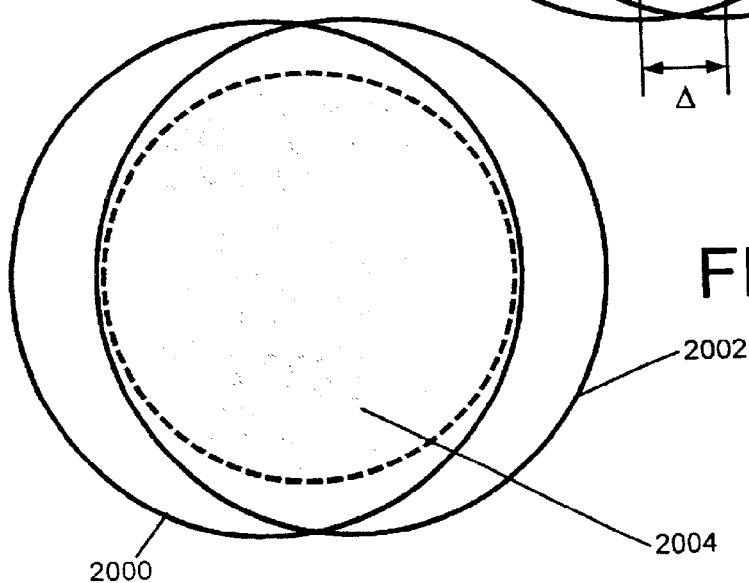
FIG. 20

A)

B)

C)

D)

MULTI-PIECE FIBER OPTIC COMPONENT AND MANUFACTURING TECHNIQUE

FIELD OF THE INVENTION

This invention relates to components and processes for fiber optic related component fabrication. More particularly, the invention relates to fabrication of fiber optic connectors and components used in conjunction therewith.

BACKGROUND OF THE INVENTION

Optical Fibers in commercial systems have been traditionally held by using a combination of pieces.

A connector assembly 100, such as shown in FIG. 1 as an exploded view is used to attach various fiber pieces (or fiber pieces and modules) together. A ferrule 102 is the part of the connector 100 into which the fibers 104 themselves are inserted before the ferrule 102 is inserted into the overall connector itself. The ferrule 102 is a 'high-precision' piece of the assembly 100. It holds the fiber(s) 104 in a precise position and ensures that when two connector pieces are attached, that the fibers in the two pieces are held in accurate alignment. The remainder of the connector 106 is 'low precision' relative to the ferrule 102.

In the multi-fiber connectors available today, most of the connections are for fiber arrays of 2 or more fibers, such as shown in U.S. Pat. No. 5,214,730, up to arrays of 1×12 (although some commercial 2×12 configurations have been tried). The connectors employed are referred to by various names depending upon who makes them. In 1×2 arrays, connectors are referred to as ST, LC, MT-RJ connectors while for 1×12 arrays the connectors are referred to as MTP®, MPO, MPX and SMC connectors, among others. In the 1×12 or 2×12 area, all of the various connectors use a common type of ferrule commercially available from, among others, US Conec Ltd. and Alcoa Fujikura Ltd. In addition, commercial connectors for small arrays (less than 12) fibers have also been proposed, for example, in U.S. Pat. No. 5,743,785.

Fiber holding pieces, such as ferrules 102, can be made by molding plastic or epoxy pieces containing holes 108 into which optical fibers 104 can be inserted. Fibers must be able to be centered in each hole precisely and repeatably.

When an array of holes is made in a material for holding optical fibers, there are two aspects which need to be controlled. The spacing between holes (the "pitch" of the holes) and the diameter of each hole. Both have some margin of error due to the inherent inaccuracies of the fabrication techniques. If inaccuracies introduce errors in either (or both) pitch or size that are too large, then the fibers can be inserted at an angle or will not be positioned correctly in the ferrule. In either case, this negatively affects the ability to couple light efficiently, if at all, from one bundle to another or from an optical or opto-electronic component to a fiber bundle. If the hole pitch is inaccurate, then fibers from one bundle will not line up well with fibers of another bundle. However, even if the center-to-center pitch of the holes is very accurate, because the hole diameter is larger than the fiber (and each hole likely varies across an array) each fiber need not be in the exact same place in the hole as the other fibers in their holes, then that can cause misalignment, leading to inefficiencies or unacceptable losses. For example, if each of the holes in a ferrule piece was accurate to within 4 microns, then adjacent fibers could be off in pitch by up to 4 microns, since one fiber could be pushed to one side by 2 microns and the adjacent fiber could be pushed in the other direction by 2 microns. While this may be acceptable for multi-mode fibers, for single mode fibers this would be a huge offset that could make connections unacceptable or impossible.

In addition, fibers should generally not be placed in a hole at an angle or, if inserted at an angle, the particular angle should be specifically controlled.

FIG. 2 shows an example ferrule hole 200 and fiber 202. The inner circle, represents an actual fiber 202 while the outer circle, represents the hole 200 in the ferrule. As shown, the difference in sizes is not to scale but is exaggerated for purposes of illustration. Nevertheless, in actuality, the ferrule hole 200 must be larger than the fiber 202 by enough of a margin to allow for easy insertion—ultra-tight tolerances can not be effectively used. While the fiber 202 should ideally be centered with respect to the hole 200, as can be seen in FIG. 3, any individual fiber 202 could also be pushed in any hole 200 to somewhere else in the hole, for example, either the left or right edge (or any other edge) where it would not be centered within the hole 200. Thus, even if the ferrule has an accurate pitch "P" between hole centers 206, adjacent fibers 202 in an array may have an incorrect pitch "P+2ΔP" due to the offset P between the center 206 of each hole 200 and where the fiber 202 lies within the hole 200, in this case, causing an incorrect pitch of P plus 2 times the individual offset ΔP in each hole.

The 1×12 and 2×12 ferrule technology currently in commercial use is based upon a glass filled epoxy resin (a high-performance plastic) which is fabricated using a common plastic molding technique called transfer molding. Today, ferrules molded out of epoxies or plastics can be made to the necessary tolerances for multimode fibers, but special care must be taken during fabrication. Plastic molding technology is very process sensitive and molds having the requisite precision are extremely difficult to make. Even so, yields tend to be poor due to the inherent manufacturing process errors that occur in plastics molding. Since the tolerances on these pieces must be very accurate (on the order of about 1 to 2 micrometers), high yield manufacture is difficult. As a result, the cost of terminating fiber bundles into these connectors can be quite expensive, running hundreds of dollars per side. In addition, the process is not scalable to larger numbers of fibers (particularly 30 or more) because of inaccuracies and yield issues associated with molding technology and reliable production of ferrules for similar numbers of single mode fibers is even more difficult.

There has been an increasing need among users in the fiberoptic field for larger groups of fibers, so demand for connectors to handle these groups has been increasing as well. As a result, creation of connectors for larger arrays, such as 5×12, have been attempted. One manufacturer is known to have made a 5×12 connector array, but achieved such poor yields that they deemed an array of that size unmanufacturable. Moreover, the cost of producing the pieces resulted in their being sold for $500 each, due to poor yield, and the mold for producing the pieces was destroyed during the process.

The problem is that in plastic molding pieces for holding higher fiber counts in small spaces results in less structural integrity for the molded piece. As such, the prior art has been forced to do without commercial connectors for such large arrays, because 5×12 arrays can not be reliably created and commercial connectors for larger format arrays (e.g. even a 6×12) are considered prohibitively difficult to even attempt.

The ferrule area is very small, since ferrules for the above MTP, MPO, MPX or SMC connectors are about 0.07" high, 0.3" wide and 0.4" deep, so molding or machining of features in the ferrules of the sizes required to hold multiple optical fibers (which typically have about a 125 micron diameter for a multimode fiber and a 9 micron diameter core for a single mode fiber) is very difficult. Since single mode fibers have an even smaller diameter than multimode fibers, molding or machining ferrules to accommodate large arrays of single mode fibers is currently, for all practical purposes, impossible—particularly on a cost effective commercially viable scale.

Additionally, making ferrules for arrays is made more difficult due to process variations during production because, as the holes approach the edge of the ferrule, the structural integrity of the walls decrease causing parts to have poor tolerance at the periphery, become overly fragile causing component collapse in some cases, or prohibiting removal of material from the inside of the piece that impedes or prevents fiber insertion.

Some have attempted to make two-dimensional fiber bundle arrays for by creating a dense packing of fibers together, for example, as described in U.S. Pat. No. 5,473,716, and K. Koyabu, F. Ohira, T. Yamamoto, "Fabrication of Two-Dimensional Fiber Arrays Using Microferrules" IEEE Transactions on Components, Packaging and Manufacturing Technology—Part C, Vol 21, No 1, January 1998. However, these attempts have not yielded a solution, particularly for the types of connectors mentioned above, because the inaccuracies of fiber production result in diameters of fibers which fluctuate within a 2 micron range (i.e. plus or minus 1 micron). Hence if 12 fibers are stacked in a row, there could be as much as 12 microns of inaccuracy in fiber alignment. Even with multi-mode fibers (the best of which use 50 micron cores), a misalignment of 12 microns will cause unacceptable light loss for most applications. For single mode fibers, which typically have 9 micron diameter cores, a 7 to 12 micron misalignment could mean that, irrespective of the alignment of the fiber at one end of the row, entire fibers at or near the other end of the row could receive no light whatsoever. For two-dimensional fiber arrays, the problem is even worse because the inaccuracy of the fiber is not limited to one direction. Thus, for example with a 16×16 array, a plus or minus 1 micron inaccuracy could result in fiber misalignments by up to 23 microns or more. Compounding the problem is the further fact that fiber inaccuracies stated as plus or minus 1 micron do not mean that fiber manufacturers guarantee that the fiber will be inaccurate by no more than 1 micron. Rather, the inaccuracy statement represents a standard deviation error range. This means that most of the fiber should only be that inaccurate. Individual fibers, or portions thereof, could have larger inaccuracies due to statistical variations.

As a result, the larger the number of fibers, the more likely a problem due to fiber inaccuracy will occur because, for example, using the 16×16 array above, the array would have 256 times the chance (because there are 16×16=256 fibers) of having at least one of these statistically anomalous fibers in the group.

Others have attempted to align two dimensional arrays of fibers (e.g. 4×4 arrays) in a research setting, but none have applied their techniques to conventional connector technologies. Moreover, the techniques are not suitable or readily adaptable for high yield, low cost, mass production as demanded by the industry. For example, some groups have examined the use of micromachined pieces made out of polyimide as described in J. Sasian, R. Novotny, M. Beckman, S. Walker, M. Wojcik, S. Hinterlong, "Fabrication of fiber bundle arrays for free-space photonic switching systems," Optical Engineering, Vol 33, #9 pp. 2979–2985 September 1994.

Others have attempted to use silicon as a ferrule for precisely holding fiber bundle arrays since silicon can be manufactured with very high precision (better than 1 micron) and techniques for processing of silicon for high yield is, in general, well understood.

Early attempts at silicon machining for two-dimensional array fiber placement were performed with some limited success and one-dimensional fiber arrays, using fibers placed in V-Grooves etched into a piece of silicon, have been created, for example, as shown in FIG. 4A. The approach used the silicon pieces to hold the fibers but no attempt was made to integrate such an arrangement into a commercial connector.

Other groups took the V-Groove approach of FIG. 4A and performed an experiment where they stacked two of pieces together FIG. 4B for insertion into a connector. This resulted in a minimal array with two rows of fibers, as described in H. Kosaka, M. Kajita, M. Yamada, Y. Sugimoto, "Plastic-Based Receptacle-Type VCSEL-Array modules with One and Two Dimensions Fabricated using the self-Alignment Mounting Technique," IEEE Electronic Components and Technology Conference, pp. 382–390 (1997), but the technique was not scalable to larger format two-dimensional arrays, such as shown in FIG. 4C.

Still other groups looked at holding larger format two-dimensional arrays using silicon pieces machined using wet-etching techniques, as described in G. Proudley, C. Stace, H. White, "Fabrication of two dimensional fiber optic arrays for an optical crossbar switch," Optical Engineering, Vol 33, #2, pp. 627–635, February 1994.

While these silicon pieces were able to hold fibers, they were not designed to be, and could not readily be, used with existing ferrule or connector technology. Moreover, they could not be used for single mode fibers with any accuracy.

Thus, none of the above attempts have provided a viable solution to the problem of how to effectively create a large format fiber array which: allows for high precision holding of large arrays of fibers, especially single mode fibers, is compatible with current commercially used connectors that attach two fiber bundles to each other or one fiber bundle to a component containing an array of optical devices, such as lasers and/or detectors, and that allows for easy fiber termination in a rapid fashion at low production cost.

In addition, because of the above problems, there is presently no large format ferrule apparatus that can maintain fibers at a low angle, or at a precisely specified angle, for good optical coupling.

Collimating arrays are conceptually arrays of pipes for light. Mass production of collimating arrays for commercial applications has largely been dominated by the digital photographic camera and digital video camera world. These applications typically use a device called a "faceplate", which is a multi-fiber assembly used to direct light onto optical detectors used for imaging. Since, for cameras, effective imaging requires the maximum amount of light reach the detectors, a faceplate will have several fibers per individual detector. In fact, in the most desirable faceplates, the number of optical fibers exceeds the number of optical detectors by many times. Thus, light being directed to a single detector in such a camera passes through multiple optical fibers arranged in parallel, and a camera has one detector per pixel. For imaging systems like cameras, this collimating technique is sufficient to accomplish its purpose. However, when dealing with optical communication systems, faceplates can not be used because the light loss resulting from such a collimating arrangement is significant. The faceplate technique (sometimes also referred to as oversampling) is also incompatible with the use of single mode fibers or lasers (which are highly desirable for use in high speed, long distance data transmission). Hence, the collimating technique of using a faceplate, such as made for use in cameras, is an unworkable approach for opto-electronic communication devices.

As noted above, for one-dimensional optical device arrays, attempts have been made to create collimators by using a piece of silicon wafer, into which V-Grooves are etched, and laying the fibers into the V-Grooves as shown in FIG. 4A. This is an operational approach for forming a one-dimensional array that is unsuitable for mass production.

Other groups have attempted to stack multiple V-Groove arrays on top of one another (FIGS. 4b, 4c) to create a larger collimating element. Unfortunately, the accuracy of stacking in the second dimension is limited by the accuracy of the thickness of the individual wafers, both on an absolute basis and on a relative basis, due to thickness variations over the area of the wafer. In addition, the stacked V-Groove technique requires such accuracy that individual stacks must be individually built up one at a time; a costly and inefficient process.

Presently, there are also no inexpensive two dimensional optical waveguide combiners available for commercial applications or that can be used with a fiber array. In some cases, optical fibers are twist fused to form a 2 to 1 "Y" branch, for example, for coupling a pumping laser to a single, signal carrying, fiber. For one-dimensional arrays of devices, Y branches have been created on the surface of a wafer by patterning, using lithographic techniques, to form waveguides. This technique provides robust control for a one-dimensional array, but cannot be extended into two dimensions since it is inherently a planar process.

SUMMARY OF THE INVENTION

We have created a processing and fabrication technique for multi-piece ferrule technology that satisfies the different needs in the art. By applying the teachings herein, ferrules that are designed for holding large format arrays of multi-mode or single mode optical fibers can be created. The processing and fabrication strategies enable low-cost fiber termination in a ferrule (i.e. the fiber bundles can be inserted in a high yield and rapid process which keeps costs of assembly minimal). In addition, if desired, fibers can be placed in the connector straight (i.e. not at an angle), or at a pre-determined angle to minimize optical loss resulting from the connector.

Advantageously, the technique is scalable, permitting subsequent generations of devices to have greater and greater numbers of fibers and allowing common designs to be used for both multimode and single mode fibers.

By using our approach, connectors that connect multi-fiber bundles to components, boards, or one another, can be made at a lower material cost, in a highly accurate manner, on a production scale previously unavailable and do so in a manner that is not overly labor intensive.

The approach further allows manufacture of easy-insertion, high yield components that, in combination, provide a precision of fiber placement accuracy that is higher than the precision of any one individual piece alone. The use of this approach allows the fabrication of individual components, using batch manufacturing low-cost processes, which, by themselves, might only be accurate enough to hold multi-mode fibers but, when the components are combined, provide accuracies compatible with holding single mode fibers, whether individual fibers, or a one-dimensional or two-dimensional fiber arrays.

Moreover, the technique for creating high precision components allows the creation of optical elements that provide additional benefits because they can be fit into a connector, may or may not hold optical fibers, and add a third dimension of freedom. This enables the construction of not only fiber holding elements, but also collimator arrays, Y branch, two-dimensional waveguides, and three-dimensional optical integrated circuits.

One aspect of the invention involves a commercial fiber optic connector of a style constructed to accept a ferrule-like unit therein has optical fibers, each having a first part and a second part separated by lengths, a low precision piece having a peripheral shape of a part of the ferrule like unit, two high precision slices each having fiber holes therein. A chamber separates the two high precision pieces defining a volume therebetween. The optical fibers have their first parts within the fiber holes in one of the high precision slices, their second parts within the fiber holes in the other of the high precision slices, and at least some of their length within the volume. The low precision piece and the two high precision slices collectively form the ferrule like unit and the ferrule like unit is contained substantially within the connector housing. Another aspect of the invention involves a method of making a commercial optical connector. The method involves making a first plate having holes, each larger than a cross sectional area of an optical fiber; making a second plate having holes each larger than the cross sectional area of the optical fiber; inserting an optical fiber in one of the holes in the first plate and one of the holes in the second plate, forming a ferrule component by connecting each of the first plate and the second plate to a chamber that separates the first plate from the second plate, and inserting the ferrule component in a ferrule location of the commercial optical connector.

These and other aspects described herein, or resulting from the using teachings contained herein, provide advantages and benefits over the prior art. For example, one or more of the many implementations of the inventions may achieve one or more of the following advantages or provide the resultant benefits of: ease of insertion of a large format fiber bundle into a large format ferrule, high yield, rapid insertion of fibers into connectors, low cost assembly, high precision (fiber placement to 1 micron or sub micron accuracy), control of fiber pitch during insertion so that single mode fibers can be easily aligned, controlled placement of multiple fibers at a desired pitch, design scalability, application scalability, integration into standard commercial connectors, compatibility with commercial connector through-hole pin-placement, manufacturability in a mass-production wafer scale process, compatibility with the thermal coefficient of expansion of silicon chips used for transmission and reception of data, lower material cost, lower labor cost, high two- and three-dimensional accuracy (since the holes in the array can be placed with lithographic precision), pieces can be stacked arbitrarily and/or large numbers to make waveguides which change in two- or three dimensions along their length, collimated couplers, optical routers, etc . . . , individual wafer thickness is irrelevant so cheaper, less controlled material can be used, stacking on a wafer basis rather than on a piece basis to allow for integration on a massive scale, and/or the ability to use optical epoxy rather than threaded optical fibers, as used in V-Groove techniques.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

FIG. 18 shows one hole for a high-precision piece superimposed over an optical fiber;

FIG. 19 shows two fiber holes of the same size as in FIG. 18 on different high precision pieces according to a variant of the invention;

FIG. 20 shows the holes of FIG. 19 holding the optical fiber of FIG. 18 where the offset is equally divided between both pieces;

DETAILED DESCRIPTION

Overview

In overview, the technique uses one or more high-precision pieces that can be combined with a low precision piece to form a ferrule-like unit and then integrated into a commercial connector as the ferrule the connector is designed to receive.

Low Precision Piece Creation

Figure 5:
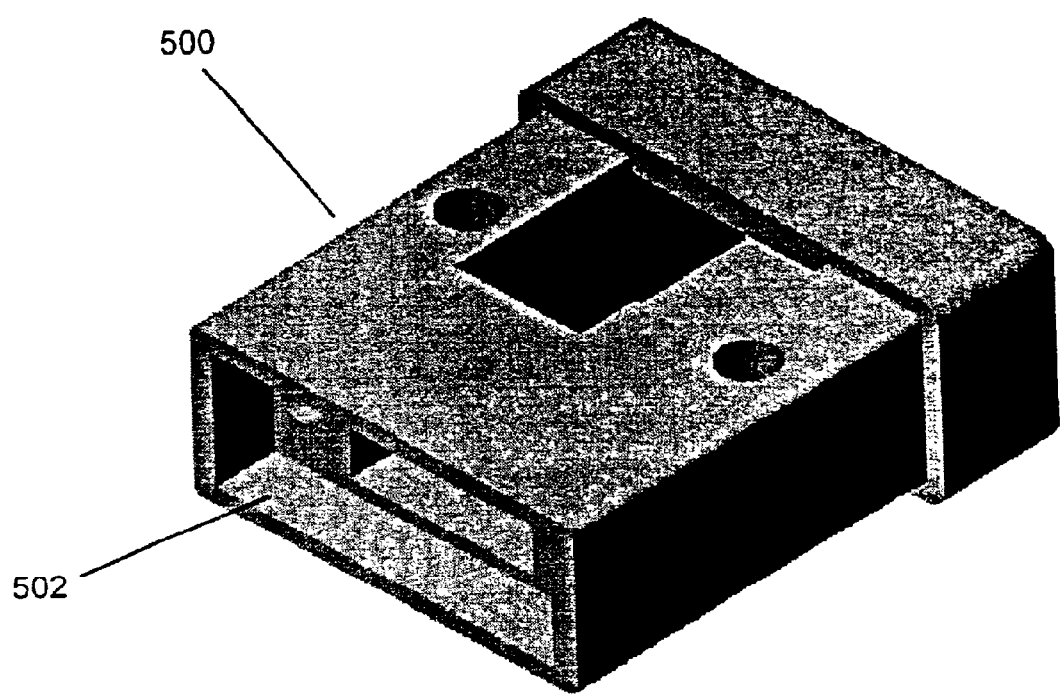
FIG. 5 shows an example of a low-precision piece in accordance with the invention.

An example of a low-precision piece 500 is shown in FIG. 5. As shown, this particular shape piece is designed in the shape of a ferrule opening in an industry standard connector apparatus so it can be inserted into a commercial connector, for example, in place of the ferrule 102 of FIG. 1. In practice, this currently means the piece should typically be shaped to dimensionally fit into at least one of an MTP or MPO or MPX or SMC style connector. Depending upon the particular variant, the low-precision piece 500 is manufactured by, for example, a polymer molding technique, for example, injection molding, transfer molding, or by some other molding, milling or forming technique. In some variants, the material used for injection molding is a glass filled epoxy, although other epoxies or plastics can be used. Alternatively, in other variants, the material is either metal or some other moldable or millable material.

The low-precision piece is manufactured to the outer dimensions to allow it to be properly inserted into the desired connector. In addition, it typically has an opening 502 that is large enough to receive the high precision piece(s).

Figure 6:
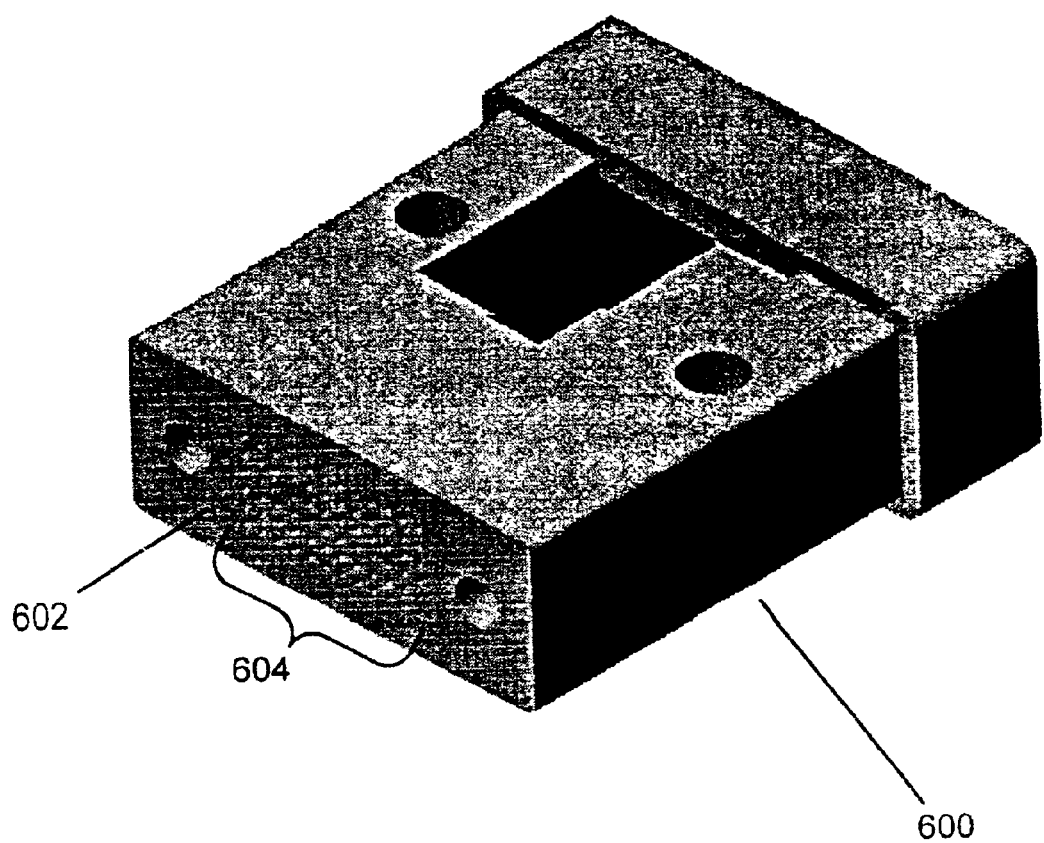
FIG. 6 shows an example of a low-precision piece that is also part high precision piece.

In some variants, the "low precision" piece may also be, in part, a high precision piece, for example, as shown in FIG. 6, if the low precision piece 600 is made out of metal and has a thin face 602 that can be processed with holes 604 as described below. However, it is expected that such variants will lack many of the advantages of using separate low- and high precision pieces, but may achieve other advantages or benefits due to the particular application it is being used for or in.

High Precision Piece(s) Creation

By way of representative example, the technique for creating the high-precision piece(s) will now be described using a wafer of silicon as the starting point.

While in some variants, silicon is used as the starting material for forming the high-precision piece(s), in other variants, materials such as ceramics, glass, other insulators, other semiconductor wafer compounds, polymers such as polyimide, or metals, such as aluminum or tungsten or alloys, can be used.

The overall manufacturing process for the high-precision piece(s) proceeds as follows:

a) The wafer is processed into a series of chips by etching holes through the wafer using either an etching or drilling process. In some variants, this is done through a semiconductor lithography process combined with an etching technique. In other variants, laser drilling is used. The holes are each of specific sizes and, where appropriate, axially offset at a specific angle relative to the plane of the wafer (or piece once cleaved). Features such as holes for alignment pins or bumps and recesses for precision mating are also created, where appropriate. The wafer contains many copies the chips that will be needed to make a particular high precision piece, for example, fiber holding piece, a collimator, many-to-one taper or Y branch. The pieces to build up an element of a particular type can be processed on a single wafer or by making several wafers, each having some of the pieces needed to make the component. In either case, the resultant wafer scale batch processing is the same and saves costs.

The holes are classified into two groups: those which are made for fiber insertion and/or receiving an optical epoxy, and those that are for alignment and/or placement into a connector. Although in the ideal case, the holes are perfectly cylindrical, frustoconical, obconic or funnel shaped, in practice the holes will only be substantially right cylindrical, right frustoconical or right funnel shaped. However, those deviations, for purposes of the processes described herein, are considered negligible since they are either a) much smaller than the optical fiber diameter and hence have no meaningful effect on placement or performance in the case of fiber holding embodiments, or virtually irrelevant in the case of waveguide embodiments.

Figure 7:
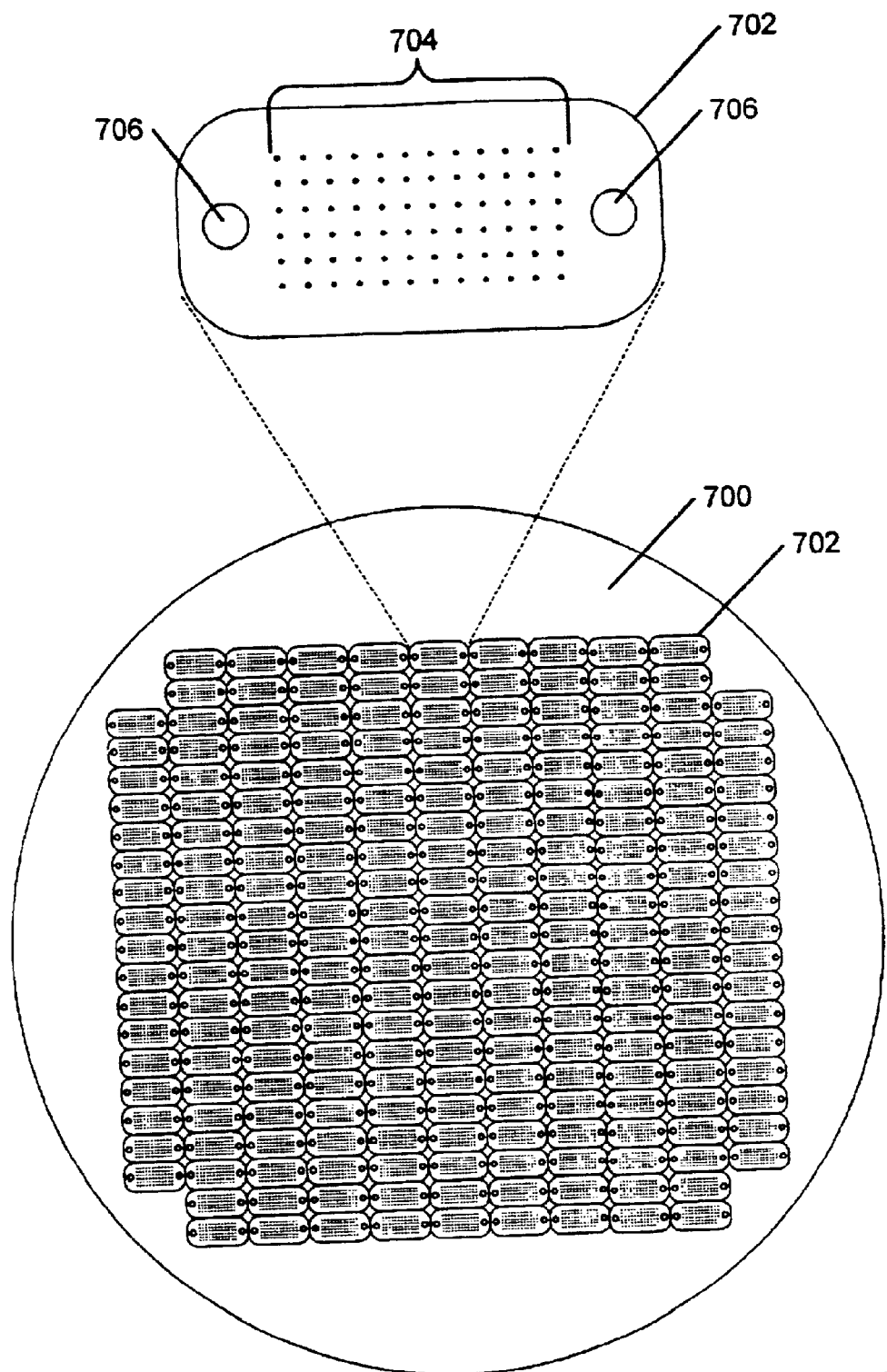
FIG. 7 shows an example wafer created using one variant of the technique described herein.

In addition, for the variants described herein, to facilitate fiber placement or create certain waveguide arrangements, in some cases it may be desirable to intentionally use cylindrical, frustoconical, obconic or funnel shaped holes that have a substantially oval, substantially egg shaped or substantially elliptical cross section perpendicular to their axes (i.e. they are not round). In other variants, use of some combination of FIG. 7 shows an example wafer 700 created using one variant of the technique described herein. Each piece 702 (also called a slice) contains a central group of small holes 704 (in this case 72 per piece) for fibers and larger holes 706 on the left and right sides of each piece for alignment of the piece relative to some other piece. Typically, the number of holes will be equal to or some multiple of the number of fibers in a commercial optical fiber bundle, for example, bundles of 6, 12, 24, 36, 48, 60, 72, 84, 96, 108, 120, 132 or 144 fibers.

Figure 8:
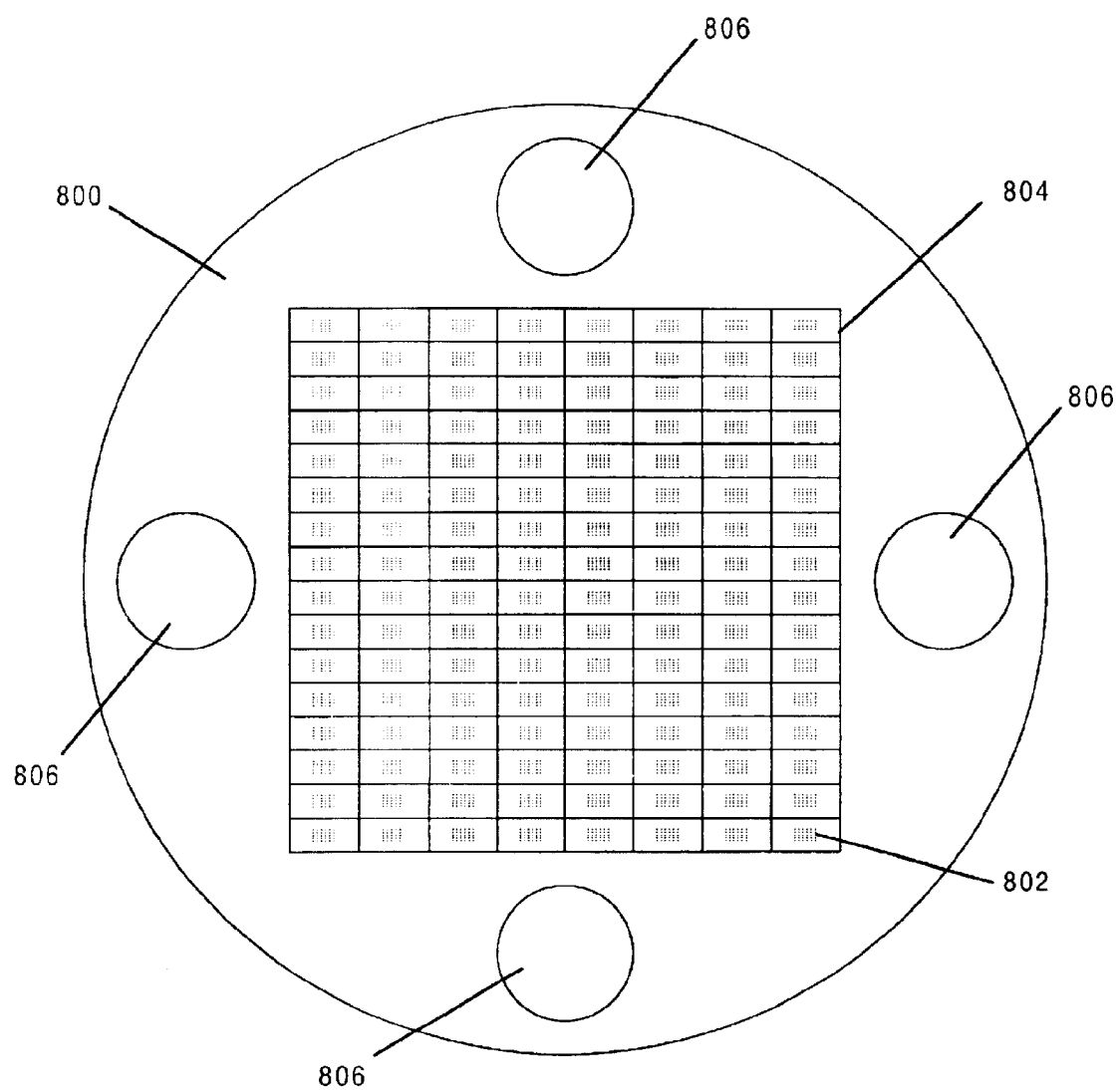
FIG. 8, shows a silicon wafer created using another variant of the technique described herein.

FIG. 8, shows a silicon wafer 800 created using another variant of the technique described herein. As shown in FIG. 8, there are small holes 802 in each piece 804 within the central area of the wafer for fibers or optical epoxy and large holes 806 near the edge of the silicon wafer for alignment on a wafer basis.

Figure 1:
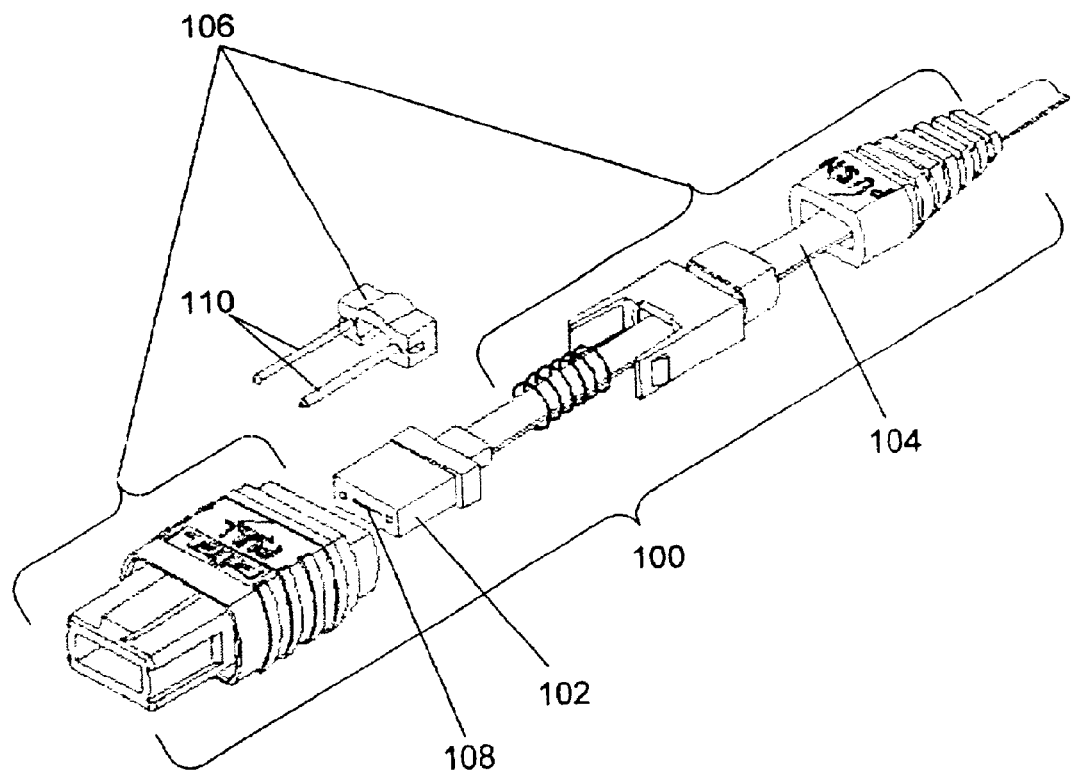
FIG. 1 shows an exploded view of a commercial connector assembly.
Figure 2:
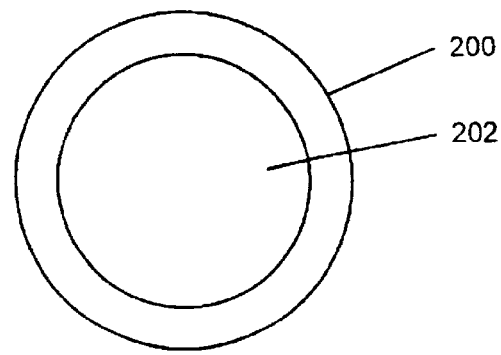
FIG. 2 shows an example connector hole and fiber.
Figure 3:
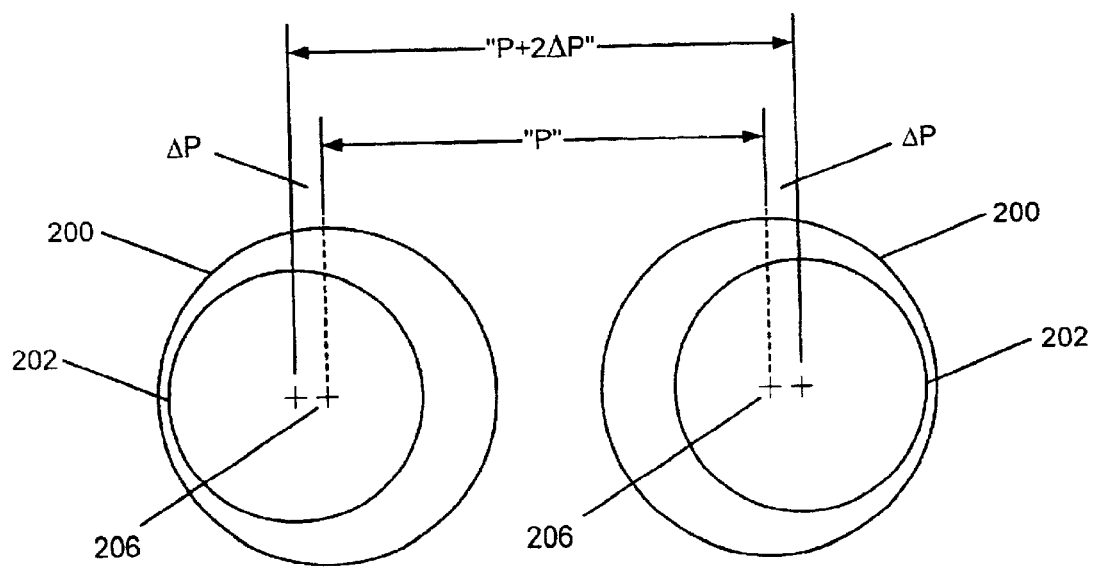
FIG. 3 shows fibers not centered within holes of FIG. 2.
Figure 4A:
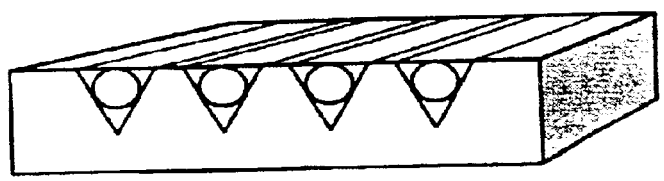
FIG. 4A shows a one-dimensional fiber array having fibers placed in V-Grooves etched into a piece of silicon.
Figure 4B:
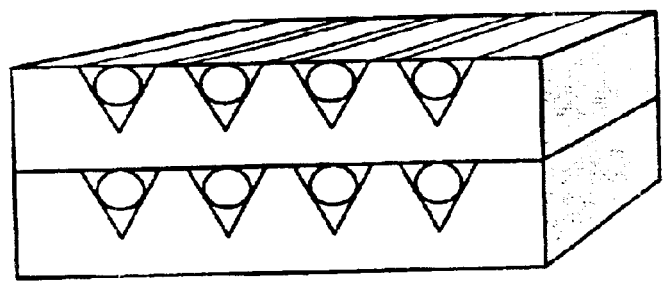
FIG. 4B shows a stack of two one-dimensional fiber arrays of FIG. 4A.
Figure 4C:
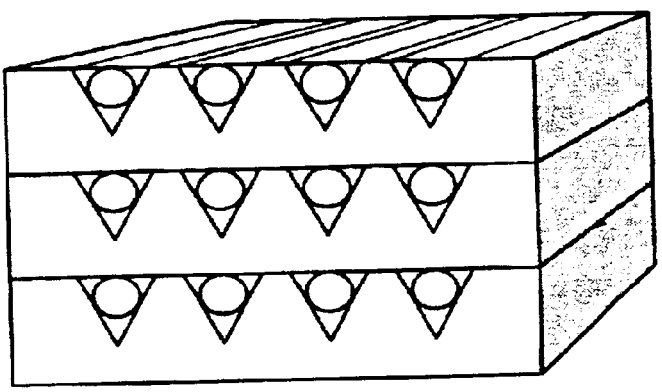
FIG. 4C shows a hypothetical large format stack of three one-dimensional fiber arrays of FIG. 4A.

Additionally, or alternatively, the alignment holes can be part of each piece and specifically be spaced so that the piece may be inserted into an MTP, MPO, MPX, or SMC or other widely available style commercial connector, such as shown in FIG. 1, as part of or in place of a ferrule and also aligned using alignment pins 110 that are on a part 1 of the connector itself.

Additionally, other holes or features may be etched into the piece to allow the insertion of epoxies, solder, or some other fastening agent to hold the piece to the low precision piece or so that two or more of the pieces can interlock with each other.

Depending upon the particular variant, in some cases, one or more of the alignment holes on one or more of the components may optionally have an oblong or oval shape to allow some freedom of movement.

Depending upon the particular variant, the particular holes may have straight or tapered sidewalls.

In some variants using straight holes, the holes are created by laser drilling. In other variants, the straight holes are formed using an etching process, for example, anisotropic hole etching. By way of example, for a silicon wafer, anisotropic deep/via hole etching of silicon is performed by photoresist patterning the wafer according to the desired hole placement and etching using the Bosch process in a high-density plasma reactor such as either an electron cyclotron resonance (ECR) or inductively coupled plasma (ICP) reactor. The Bosch process is based off of a time multiplexing scheme separating the etch (SF6) and passivation (C4F8 sidewall protection) cycles. The etch causes scalloping on the silicon sidewalls and sharp edges at the base of the via but the profile produces nice straight holes/vias. Since the scalloping creates edges are too sharp for fiber insertion without a guiding structure to help the fiber avoid the edges at the base of the structure clean-up etching is required.

Both the clean up etching process and the process of creating tapered holes is essentially the same. In addition to the Bosch process, for clean up and creating tapered holes, an isotropic (non-directional) silicon wet etch (HF:HNO$_3$, 1:1) is used. This produces smooth, damage free tapered surfaces. In addition, the isotropic wet etch eliminates and/or reduces the scalloping and sharp edges created from the Bosch process, making fiber insertion easier and more reliable.

Alternatively, holes/vias can be made with a combination of etching with KOH and the Bosch process. Both KOH etching and Bosch process etching are well understood and used widely. Etching of silicon using KOH is also well known and is used in the micro-machining industry and the micro electro mechanical systems (MEMS) area.

In the alternative variants, a Bosch etch is used on the front side of the (100) silicon wafer. Then a $SiN_x$ stop layer for the KOH is deposited in the Bosch etched front side hole. The back side of the wafer in then photoresist patterned in alignment with the front side of the silicon wafer. The back side is then wet etched with KOH. The $SiN_x$ is then removed. The scalloping and sharp edges are then smoothed with $HF:HNO_3$, (1:1). This process produces a via hole that is both sloped and anisotropic with a sidewall profile that facilitates fiber insertion.

The process is similar to create the pieces using other materials except, the specific etch process used will differ based upon the particular material being used. Since techniques for etching and/or drilling of holes in other materials such as ceramics, glass, other insulators, other semiconductor wafer compounds, polymers such as polyimide, or metals, such as aluminum or tungsten or alloys are all presently known and can be applied in a straightforward manner based upon the teachings contained herein, the specific details of performing similar/analogous operations, on the other materials, are omitted for brevity.

In addition, by optionally orienting the wafer during the etching process and using a dry etching processes, it is possible to etch the holes in a preferred direction or at a specified angle. This is desirable since a controlled angled insertion allows higher efficiency coupling into single mode fibers (i.e. non-tapered holes can be etched at a specified angle, for example, an angle up to about 8 degrees with respect to a perpendicular to the wafer surface, and thus allow inserted fibers to be accurately held precisely at the specified angle). This allows a ferrule for single mode fiber to be easily and inexpensively created.

b) Depending upon the wafer material's refractive index, the wafer and/or the holes can optionally be coated with a thin layer of metal deposited, for example, by such techniques as sputtering, evaporation, electroplating or electroless plating.

c) Portions of the wafer may also optionally have a dielectric, solder or other adhesive deposited on it, for example, by surrounding some of the holes with a ring of reflowable solder a few microns thick or using deposition techniques such as sputter deposition.

d) In some variants, the wafer is then diced into individual pieces. In other variants, for example, in a batch manufacturing process, the wafer may not be diced until after any of e), f), g), h) or i) below depending upon the particular wafer, type of arrangement being created or other manufacturing reasons irrelevant to understanding the invention.

e) The wafers or individual wafer pieces are stacked onto alignment pins.

Figure 9:
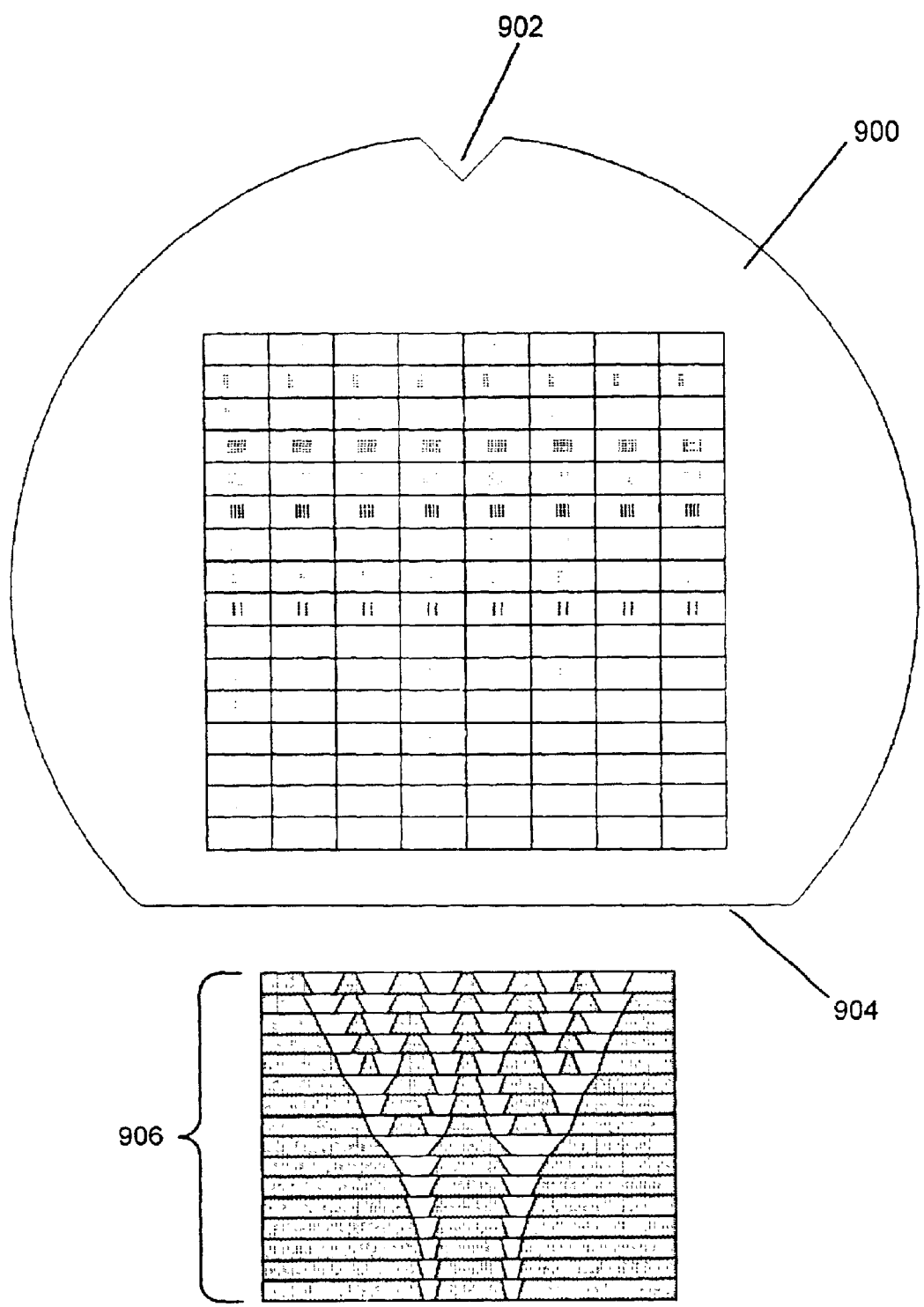
FIG. 9 shows a silicon wafer created using another variant of the technique described herein having a feature for accurate alignment of the wafer relative to another wafer and/or holding of the wafer.

Depending upon the particular application differing methods will be used for alignment, for example, holes 806 can be placed for alignment on a wafer basis (as shown in FIG. 8), rather than on an individual piece basis. Alternatively, instead of using alignment pins, on a wafer of piece basis, a wafer 900 can have some other feature, for example, a notch 902 and/or flattened portion 904 such as shown in FIG. 9 for accurate alignment and/or holding of the wafer. In some variants, other techniques for alignment can be used, such as, putting the pieces into a holding jig or using interlocking complementary features etched into each piece.

f) The wafers or individual wafer pieces are then fused together, for example, by heating and melting the solder, which fuses the pieces together, or by using other bonding techniques including, those using pressure, adhesives or mechanical devices such as clips, screws or rivets.

g) Optionally, if the holes will not directly hold fibers or hold an element like a microlens or diffraction grating, optical epoxy and/or dielectric material(s) are flowed and/or sputtered into the holes and, in the case of epoxy, cured to harden it.

h) The alignment pins are optionally removed, and i) The end faces of the piece are polished to optical quality.

The final piece can also be ground down, prior to, or after, step i), to any specific final shape desired, since the shape of the high-precision piece as it goes into the low precision piece can be different from the shape after the pins are removed or the pieces are diced.

It should be noted that the above steps need not be performed in precisely the order specified. Since the various permutations and combinations are to numerous to detail, it should be understood that, in some cases, the order can be changed without changing the invention.

Some example variants use a wafer-at-a-time process for creating the high-precision pieces in bulk. By making the pieces in wafer form, large numbers of pieces can be made simultaneously, thus keeping the costs down. As shown in FIG. 7 over 220 pieces can be made on a single wafer at one time. Typically, if an industry standard four inch wafer is used, over 400 pieces for an MTP connector ferrule can be made per wafer. Using an eight inch wafer, allows production of three to four times that number.

Connector Creation

The connector is created by combining the high precision piece(s), the low-precision pieces, inserting the fibers, and incorporating the combined piece into the remainder of the connector.

Figure 10A:
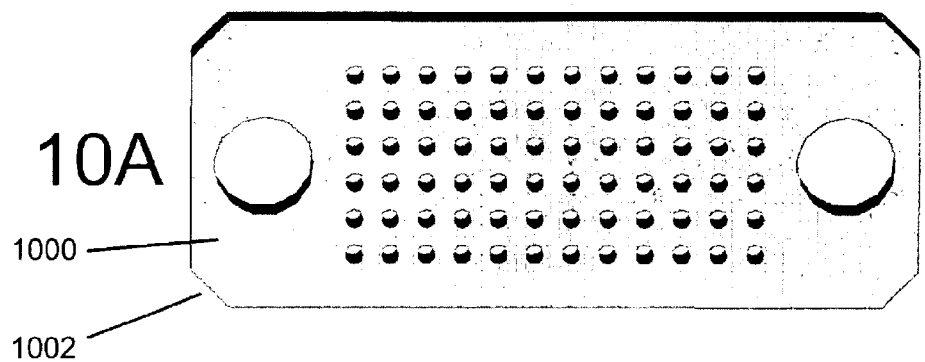
FIG. 10A shows an example high precision piece made using one variant of the technique described herein.
Figure 11:
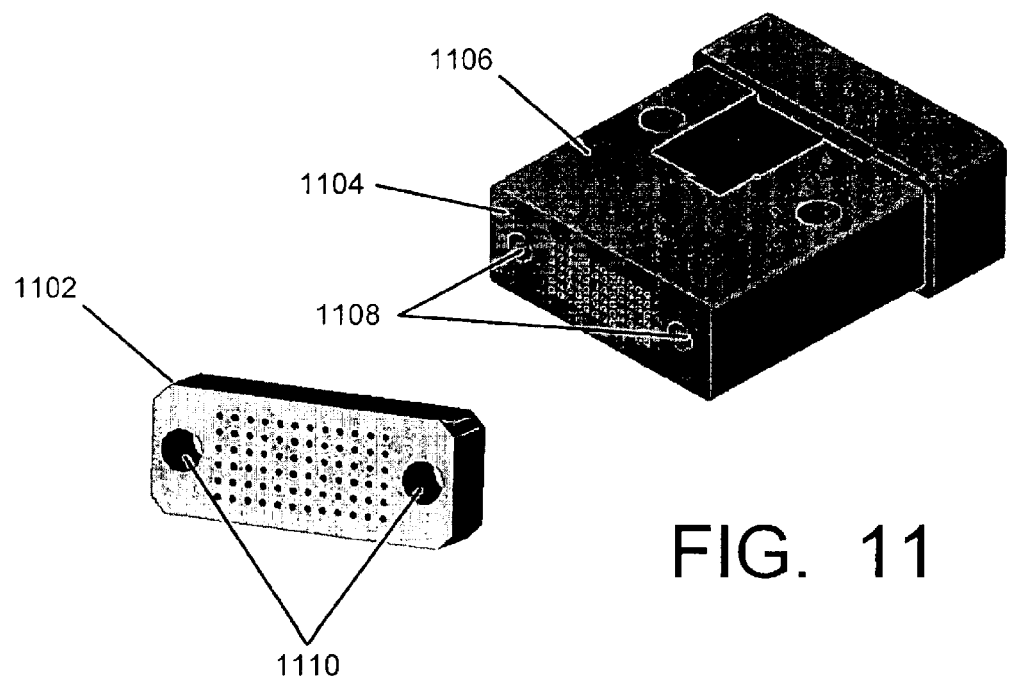
FIG. 11 shows a high-precision piece set up to mount flush on a face of a low-precision piece.

The high precision piece(s) are inserted into a recess in the low-precision piece and secured, for example, by being epoxied into place to hold the pieces together. FIG. 10A shows an example high precision piece 1000 made of silicon using one variant of the technique. As shown in FIG. 10A, the corners of each high precision silicon piece are chamfered 1002, specifically at 45 degrees, to allow a region of space, between the high precision silicon piece 1000 and the innermost edge of the receiving portion of the low precision piece, for a fastening agent. As noted above, other features or holes can be used along with or instead of the chamfers for a similar purpose. Alternatively, as shown in FIG. 11 the high-precision piece 1102 can be set up to mount flush on a face 1104 of the low-precision piece 1106.

It is also important to place the high precision piece accurately on or into the low-precision piece so that the fibers in the connector will align properly with their counterparts. This can be done, for example, by inserting an alignment piece 106 (such as shown in FIG. 1) containing alignment pins 110 which will protrude through holes 1108 in the low-precision piece and then through the alignment holes 1110 in the high precision silicon piece 1102.

Depending upon the particular connector, the alignment pins can be removed at this point and not used in any further operation, if they are not needed or not desired or can remain in, for example, as would be the case for the MTP connector of FIG. 1. Fibers are inserted through the low-precision piece and then through the high precision piece so as to terminate in, or just beyond the outer face of the high precision piece. The low-precision piece then is filled with epoxy to hold the fibers in place via, for example, an inlet formed in the piece. If desired, the combined unit can then be polished so that the ends of the fibers are flush with the face (i.e. the front) of the combined piece. Optionally, the face of the piece where the fibers are visible can be coated with a diamond thin film (or other hard material) to prevent the silicon from being worn down during the polishing process.

Applications

The processes described above for creating the different pieces have numerous applications. A few will now be described in simplified fashion, bearing in mind that more complex arrangements and/or combinations of the described applications can be readily created using variations on the techniques and applications described herein.

Ease of Insertion Variants

Pieces, which have a wide opening on the side where fibers will be inserted while having a narrower opening at the point where the fibers exit, can be used to make fiber insertion easier.

Figure 12:
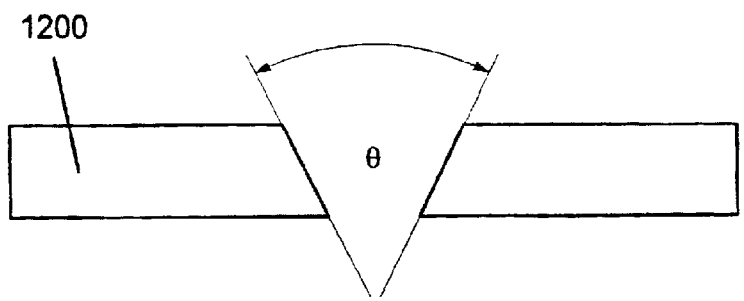
FIG. 12 shows a tapered piece having a potentially large angle of insertion.

As shown in FIG. 12, a tapered piece 1200 by itself would result in a potentially large angle of insertion "θ" because the fiber will not be constrained within the piece in a particular position owing to the fact that it can be inserted at an angle, rather than straight in. This is not desirable since it can cause a loss of light when coupling light between two such connectors or when connecting a fiber bundle to a component that emits, detects or routes light.

In order to ensure that the angle is minimized, any of four basic approaches (or some combination thereof) are used.

Figure 13:
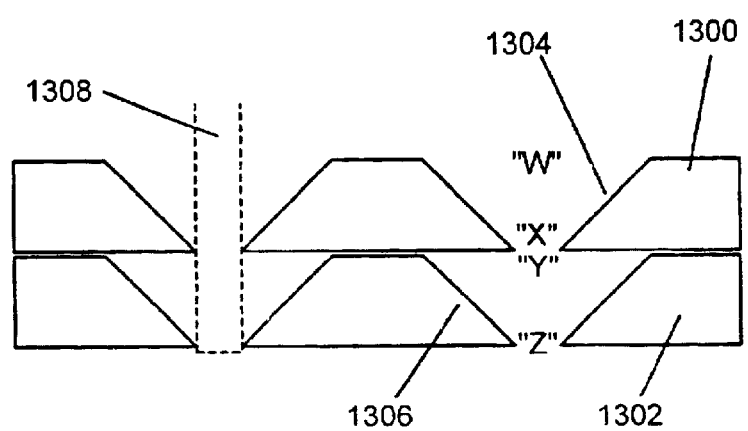
FIG. 13 shows one approach to ensuring that an angle of insertion is minimized.

Approach 1: Two high-precision pieces 1300, 1302, having tapered sidewalls 1304, 1306 are stacked on top of one another so a fiber 1308 has to pass through two narrowing regions (the tapered sidewall holes) which are separated by a space (of typically either the thickness of the last piece to be passed through or that thickness plus some other distance). This is illustratively shown in FIG. 13. Ideally, in such a case, the hole on the side of the piece into which a fiber will first be inserted will have a diameter W and the hole on the opposite side will have a diameter X, where W>X. Ideally, the diameter X will be close to the diameter of the fiber, although it will likely be larger. The other piece will have a hole, on the fiber entry side, of a diameter Y which can be any size equal to, or between, W and X. The exit side of the other piece will have a hole diameter of Z, where Y≧Z.

Figure 15:
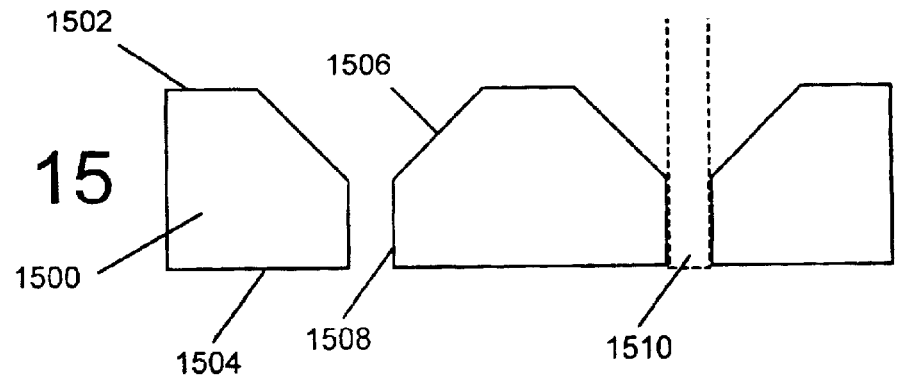
FIG. 15 shows a third approach to ensuring that an angle of insertion is minimized.

Approach 2: The two high-precision pieces 1400, 1402 are stacked on top of one another as above, but the first one to be entered by the fiber has tapered sidewalls 1404 and the other is etched or drilled with "straight" sidewalls 1406 (i.e. they may, or may not, be angled with respect to a perpendicular to the surface of the piece). The tapered region allows ease of insertion of a fiber 1408 while the straight region maintains a low angle of insertion for a fiber 1408. A longer region of straight sidewalls provides more support and stability for the fiber and thus holds it in place more firmly and without the risk of edge pieces nicking the fiber. This is shown in FIG. 15.

Approach 3: A single high-precision piece 1500 is fabricated in a two-step process where the piece is etched in a tapered fashion on one side 1502 and then etched anisotropically on the other side 1504 so that the hole on one side of the piece is tapered 1506 while the other side of the hole in the piece has straight sidewalls 1508. This results in a single piece (which saves material costs and assembly time) that allows for easy fiber 1510 insertion and a low angle of insertion of a predetermined offset from a perpendicular to the piece for single mode fibers. This is shown in FIG. 5.

The piece in this approach could be twice as thick as in approaches 1 or 2, so as to fit into the same low precision piece. Alternatively, a low precision piece specifically designed to accept the piece made using approach 3 can be used.

Approach 4: Either two piece approach above is used, but the fiber holes in one or both of the two pieces are made slightly oval, although not necessarily in alignment with each other. This allows for more flexible spacing of the guide pin holes to account for inaccuracies in either the guide pins themselves or the guide pin holes, which are sometimes less accurate than the fiber holes due to their size.

Figure 16:
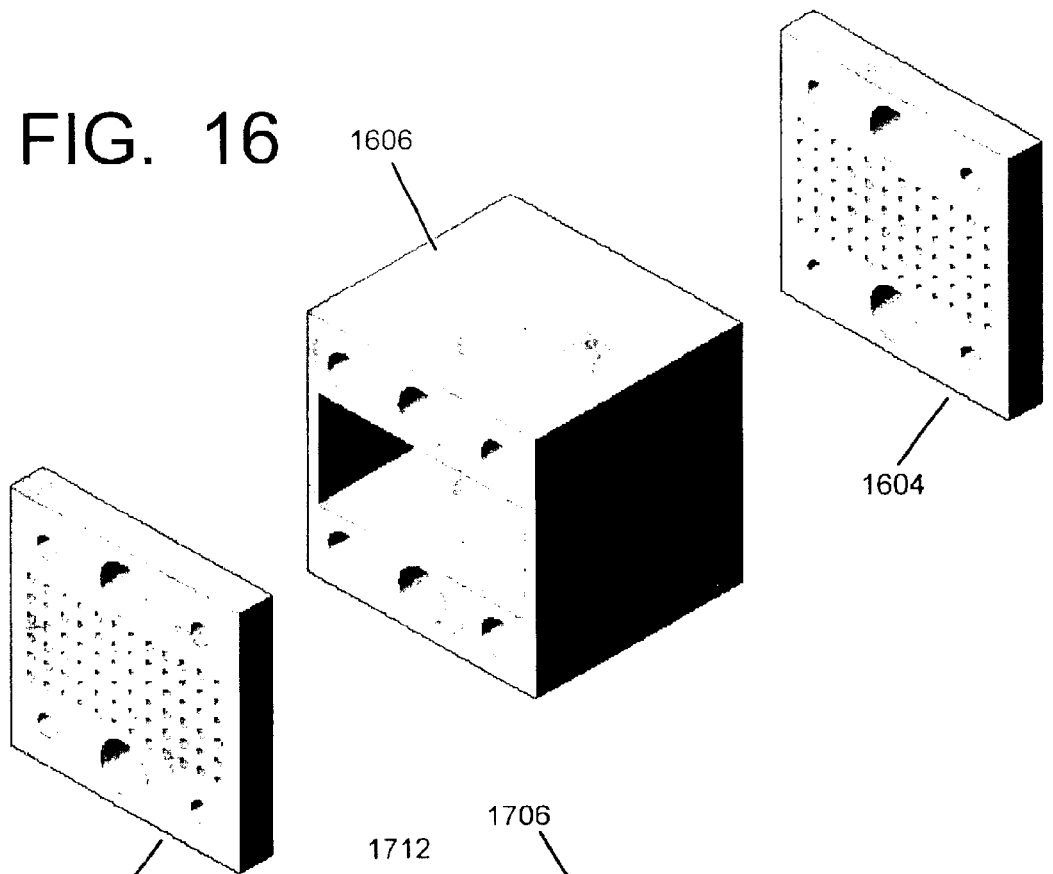
FIG. 16 shows a variant comprising two high precision pieces and a chamber.
Figure 17:
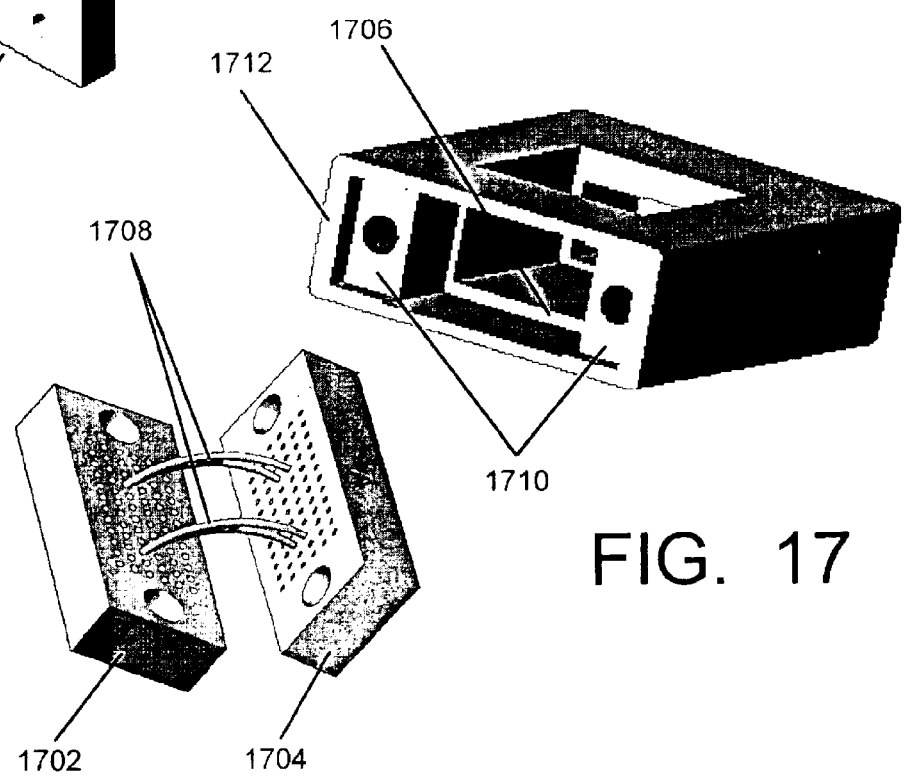
FIG. 17 shows another variant comprising two high precision pieces and a chamber.

In still other variants, such as shown in FIGS. 16 and 17, two high precision pieces 1602, 1604, 1702, 1704 are created as described herein. In addition, a low precision "chamber" 1606, 1706 is also created between the two pieces which can fully surround the fibers (such as shown in FIG. 16), partly surround the fibers (such as shown in FIG. 17), or not surround the fibers at all (for example by using precision standoffs or spacing posts 1710). In other words, instead of being stacked against each other, the high precision pieces 1602, 1604, 1702, 1704 will each be separated from each other by the chamber 1606, 1706 or the standoffs/posts 1710. Individual fibers or a fused tapered one or two dimensional arrayed waveguide structure, either in Y-Branch 1708 or straight form, is inserted through each of the high precision pieces 1602, 1604, 1702, 1704 to create a collimating element which can have a ferrule-like outer peripheral shape 1712, "shuffle" signals passing through the element from one side to the other, or perform a 2 (or more) to 1 mapping of optical devices to optical fibers. Once the fibers are inserted, the high precision pieces 1602, 1604, 1702, 1704 are attached to the chamber 1606, 1706 and the chamber or area around the fibers is filled with an epoxy or other hardening agent. The portions of the fibers extending outside the element are then cut off, and the exposed faces are polished as noted above. This will allow, for example, a one or two dimensional array of lasers to be coupled in groups into a separate array of fibers, multiple devices which emit at different wavelengths to be coupled into individual fibers, or multiple lasers at a single wavelength to be coupled into single fibers to allow redundancy during data transmission.

High Accuracy Holding Variants

Two pieces that are designed with commonly aligned fiber holes but alignment holes or other structures that are offset, relative to each other, can be used to provide greater accuracy in fiber holding than either piece can provide alone.

Instead of having the aligning structures in the two pieces in exactly the same position with respect to the fiber holes, the relationship between the aligning structures and the fiber holes is offset so that the fiber holes in the two pieces do not completely line up. FIG. 18 shows one hole 1800 for a high-precision piece superimposed over an optical fiber 1802. Note that the hole is almost 25% larger than the diameter of the fiber. FIG. 19 shows two fiber holes 1900, 1902 of the same size as in FIG. 18 on different high precision pieces according to this variant. Instead of the fiber holes being aligned when the pieces are aligned, these fiber holes are offset relative to each other when the alignment structures or holes are aligned. The offset is intentionally set at about a predetermined amount, such that the two closest parts of the holes are spaced apart by about a fiber diameter. The offset Δ (as shown in FIG. 19), allows two holes which are larger than a fiber to hold that fiber very accurately since the width of the biconvex opening 1904 formed by the two pieces, taken along a line passing through the centers of the holes, is very close to the diameter of the fiber to be placed inside and be closely constrained. Ideally, as shown in FIG. 20, the holes 2000, 2002 are the same size (so the offset is equally divided between both pieces) so that a single wafer can be used to create one format piece and two identical pieces can be used to hold a fiber 2004 by placing them back-to-back. By way of example, if for a particular application the fiber holes were, 4 microns too large, offsetting the two pieces by a few microns increases the pitch accuracy from a worst-case of 4 microns to as much as a sub-micron accuracy. This potentially provides a substantial improvement in coupling efficiencies between fibers.

Figure 21:
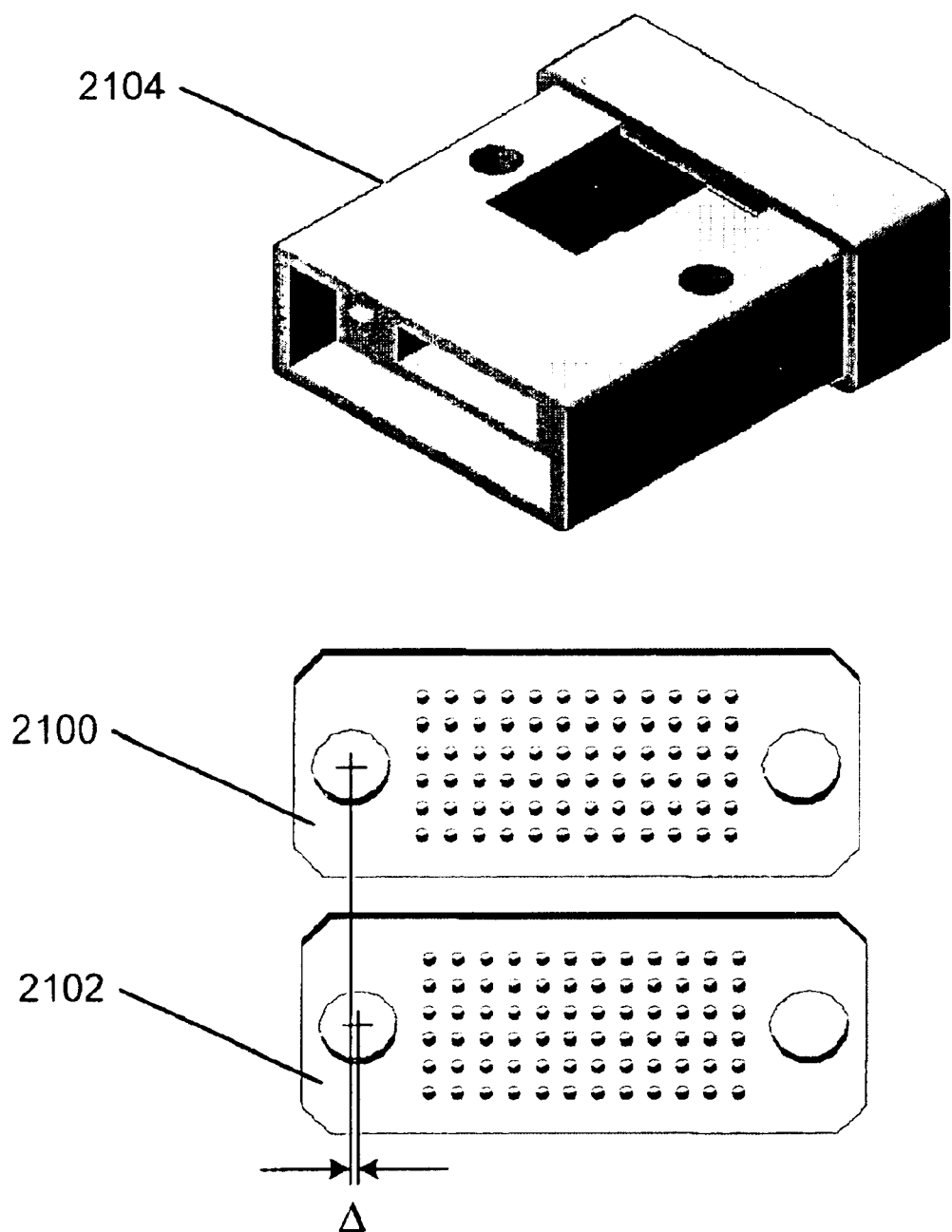
FIG. 21 shows one example of a three piece holder approach.

As noted above, elements can be created that combine a high precision piece and a low precision piece. Advantageously, if it is possible in the particular case to make a "low precision" piece with a hole size of a specified (im)precision but precise offset, then only one high-precision silicon piece need be used to hold a fiber with high accuracy. This further reduces the number of element components from three to two. FIG. 11 shows one example of the two piece holder approach and FIG. 21 shows one example of the three piece holder approach using the high precision pieces 2100, 2102 having the specified offset A and a low precision piece 2104.

The combined pieces can be made in a size and shape that is compatible with conventional connectors, for example, the low-precision piece is the size and outer shape of the conventional ferrule for the connector of FIG. 1.

Thus, the precision of the fiber hole pitch of the combined unit is higher than the precision that would be obtained by using or conveniently or cheaply obtainable with any of the individual pieces themselves.

Waveguide Variants

The high precision pieces need not necessarily be designed to hold a fiber. Instead, an arbitrary number of pieces can be created such that, once the pieces are stacked, if the holes are filled with an optical epoxy a waveguide or collimating element is created.

Such elements are constructed by patterning holes on individual high precision pieces in an aligned or offset layered fashion and then stacking those pieces together to form optical routing topologies in the third dimension. This makes creation of not only simple waveguide structures possible, but more complicated waveguide topologies, structures to route optical signals through the use of photonic bandgap engineering materials containing periodic structure features throughout the material in each of the pieces, or integration of other elements, for example, (by etching or depositing lenses or diffraction gratings in one or more of the pieces. Through creative use of the technique, even more complex geometric arrangements or combinations can be achieved.

Figure 22:
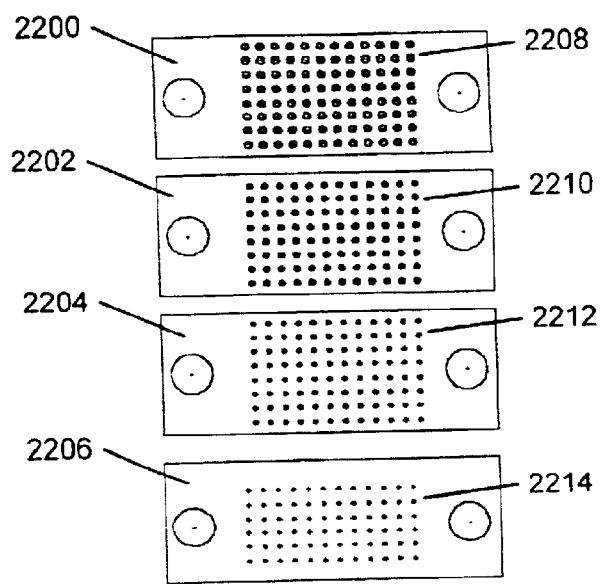
FIG. 22A shows four wafer pieces or slices with a two dimensional array of holes in the center of each slice.
FIG. 22B shows the wafer slices of FIG. 22A in stacking order.
FIG. 22C shows the stack of FIG. 22B being aligned on alignment pins.
FIG. 22D shows the stacked wafer slices of FIG. 22C connected to form a high precision waveguide piece.
Figure 22:
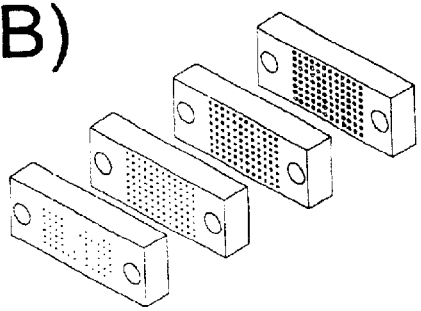
Figure 22:
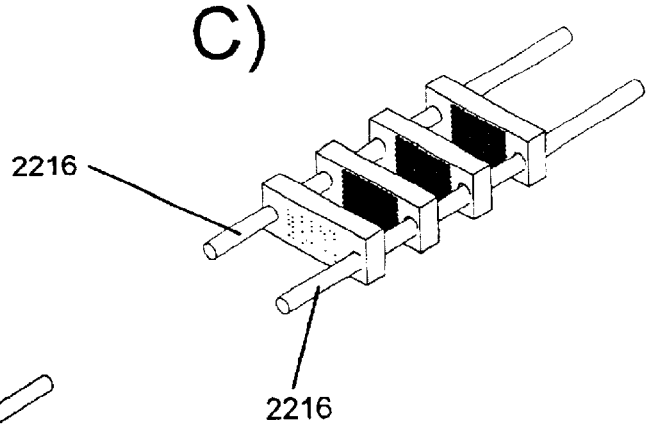
Figure 22:
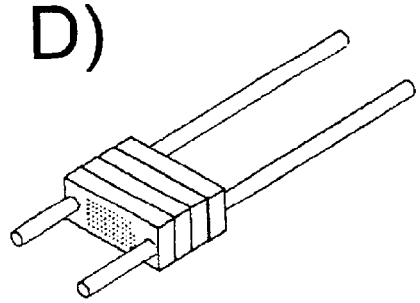

FIG. 22A shows four wafer pieces 2200, 2202, 2204, 2206 with a two dimensional array of holes 2208, 2210, 2212, 2214 in the center of each piece. Note that the holes in each of the arrays of a piece are the same size, but the different pieces have different size holes with respect to one another. These pieces are then stacked (FIG. 22B) and aligned on rods or pins 2216 (FIG. 22C) so that, when fully integrated, they are pushed together in close contact (FIG. 22D). Once the pieces are stacked, and aligned with respect to one another, the holes are turned into an optical guiding medium. This is accomplished by flowing an optically transparent epoxy into the holes and curing it into a hardened form. This effectively creates optical fibers inside each of the holes.

In some variants, the walls of the holes are also coated with a metal layer before the epoxy is flowed into the holes.

In other variants, instead of, or in addition to, the metal layer, a thin, low dielectric material layer is added on top of the metal prior to flowing the epoxy.

Note that the epoxy or other material which is flowed into the holes needs to be a higher refractive index than the material which is used to form the walls of the holes. If this is not the case, then the walls of the holes in the wafer pieces that will serve as part of the waveguides are metalized using, for example, electroplating or electroless plating.

Figure 23:
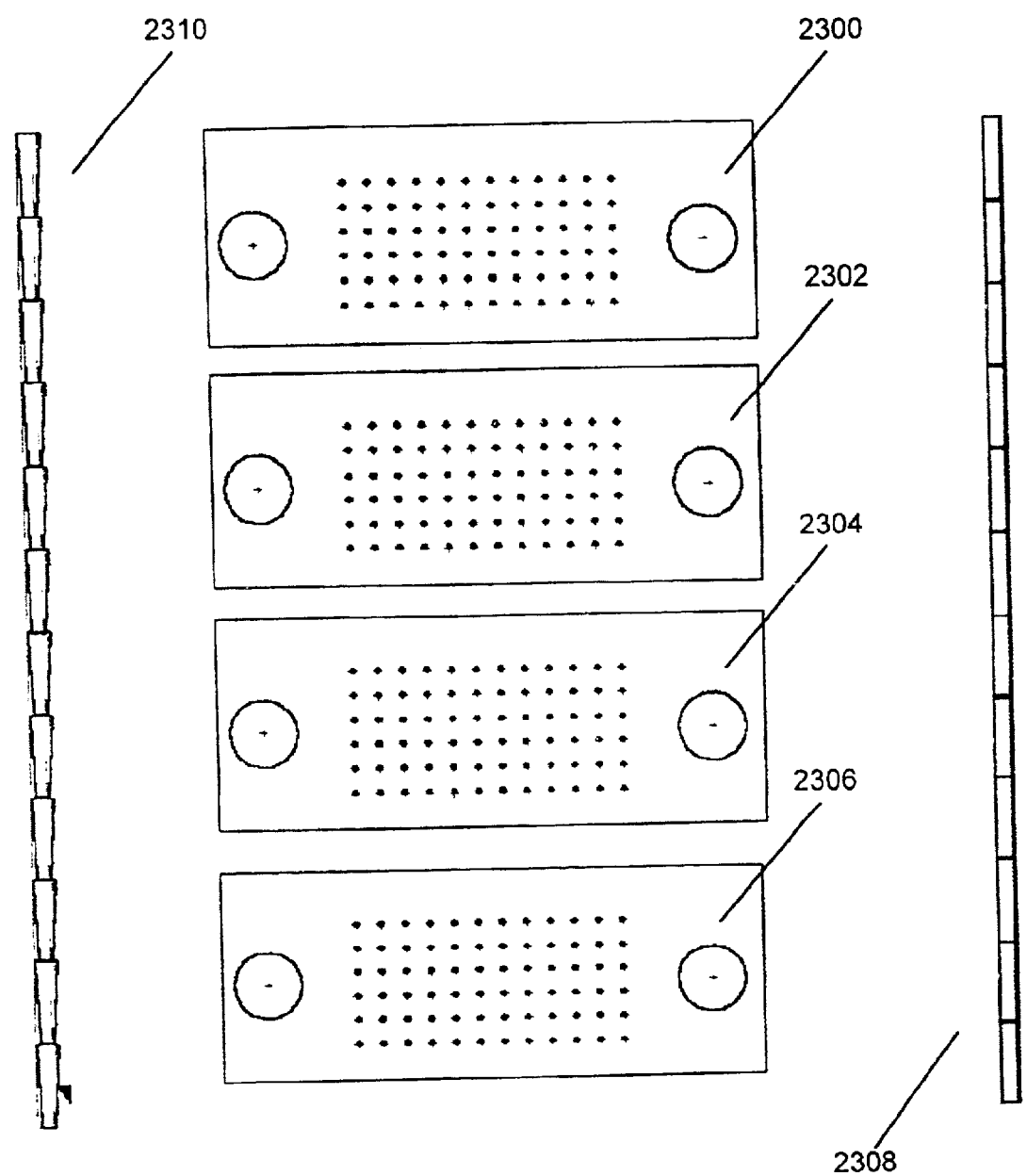
FIG. 23 shows a series of semiconductor wafer pieces fabricated with holes nearly the same size along with cutaway views of two variants thereof.

FIG. 23 shows a series of semiconductor wafer pieces fabricated 2300, 2302, 2304, 2306 with any array of guiding holes, all nearly the same size. These pieces are stacked on top of one another so that the guiding holes are all aligned. An optical epoxy is flowed through the holes in the pieces and cured to form the guiding material. Each resultant waveguide guides light from one end to the other end. As can be seen from FIG. 23, a number of pieces can be stacked together to form a collimating element made up of waveguides of arbitrary but controllable length. For example, if the wafer were 250 microns thick and twelve of them are stacked together, a piece 3 millimeters thick would result.

Ideally, if accuracy of alignment can be made high enough, all of the holes should be made perfectly straight to enable a ultra-low-loss transfer of light from one side to the other. However, as will typically be the case, if alignment between individual pieces cannot be held to tight enough tolerances, each of the pieces can have a tapered hole. The pieces are then stacked with the smaller end of one piece feeding into the larger end of the next piece in the direction of expected light travel. Thus, if the two pieces are slightly misaligned, the small end will still allow light to transfer into the next piece through the next piece's larger end. In this configuration, it is important that the pieces be arranged so that light will always traverse in the direction from the larger ends to the smaller ends to ensure that the maximum amount of light traverses each interface.

FIG. 23 also shows in cross section what one of a series of holes in an array of holes would look like in a straight sidewalls variant 2308 and a tapered sidewalls variant 2310 after stacking a number of wafer pieces. As can be seen, in the example cross sections, twelve pieces have been stacked to achieve the resultant shape.

In another variant, by using tapered holes that are intentionally slightly offset from piece to piece in a particular direction, the hole can direct the light to another location. By using this technique creatively, a waveguide can actually "swap" or "shuffle" light among fibers. For example, with a two fiber connector will mate with another two fiber connector, light leaving fiber 1 will enter the corresponding fiber in the other half of the connector. Advantageously, by using a connector created as described herein, a stack of high precision pieces can be used to direct the light leaving fiber 1 into the fiber that does not correspond when the connectors are joined. This approach can be readily extended to multiple fibers in the same connector.

In a further variant, the same process is followed, but the holes are all tapered narrower and narrower in each successively stacked piece (i.e. the openings in the first piece are large and the holes in each successive piece in the stack tapers smaller and smaller).

This allows, for example, a one-dimensional or two-dimensional array of optical devices to be coupled to a one dimensional or two dimensional array of optical fibers when the number of optical devices exceeds the number of optical fibers and hence it becomes desirable to merge the signals from several optical devices into a single optical fiber. This is useful when redundant devices provide for backup signal capability (i.e. one device can operate as the primary device while the others coupled into the fiber can be operated as backup devices). Another application allows several optical devices, each with its own operating wavelength, to be combined into a single fiber.

Figure 24:
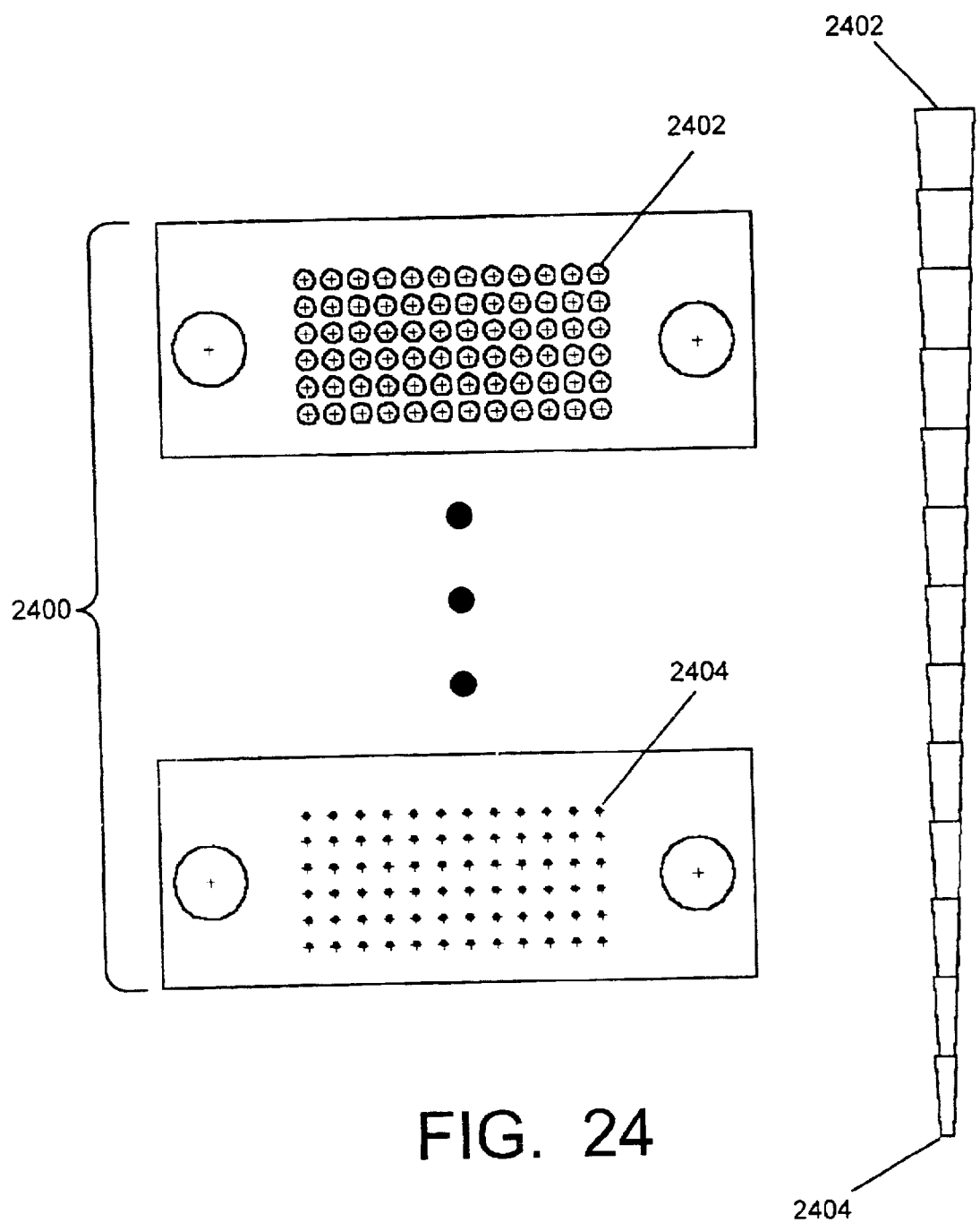
FIG. 24 shows one example tapering waveguide variant.

There are at least two ways this can be done. One, shown in FIG. 24, is to create a one-dimensional or two-dimensional array of tapers using multiple pieces 2400 which when formed into a waveguide combine the light from a larger area 2402 on one side and taper it down to a smaller area 2404 on the other side. On the larger end 2402, the opening of the tapered array pieces can have a diameter large enough to accept light from several optical devices simultaneously.

Figure 25:
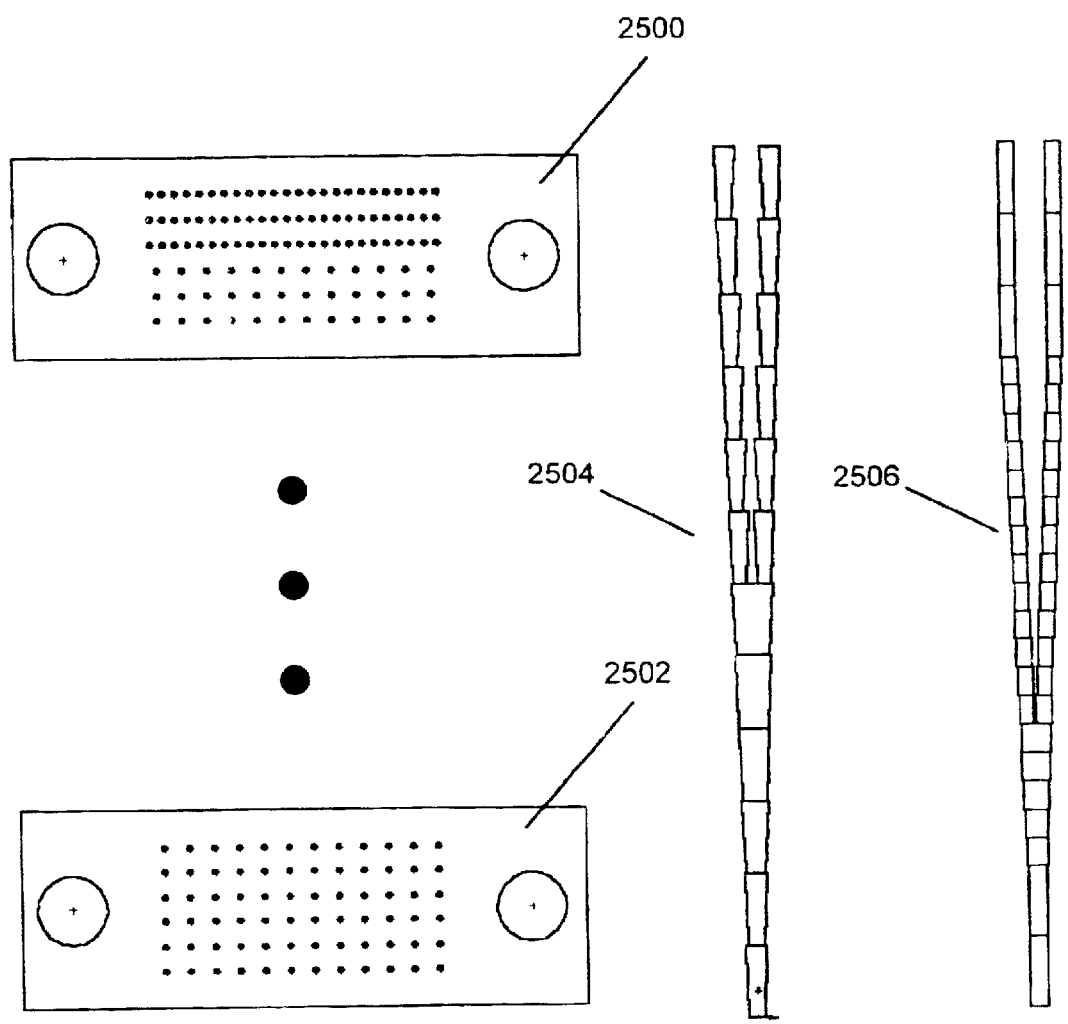
FIG. 25 shows an example of a two dimensional array of optical Y branches created using one variant of the techniques described herein.

An alternative variant, shown in FIG. 25, the pieces (only two of which 2500, 2502 are shown) are designed to be stacked so as to create a two dimensional array of optical Y branches 2504, 2506 which can combine two (or more) optical signals into single fibers. Depending upon the particular application, the Y branches can be symmetric, asymmetric or developed in random patterns to provide unique connection topologies.

In yet a further variant, by using different sized holes and offsetting them from piece to piece in the stack the same technique can be used to combine multiple waveguides into a single waveguide, for example, for combining the outputs of several optical devices or coupling multiple devices into an individual optical device.

Note that even more complex connections are possible using a similar technique, for example, 4 to 1 combining arrangements, shuffling of individual fiber outputs, combining of non-next nearest neighbor devices, etc. For example, a stack 906 of pieces from the wafer shown in FIG. 9 (stack shown in cutaway cross section not to sacle) creates a 6 to 4 to 2 waveguide.

Thus, it should be understood that the technique adds a third dimension of freedom and thus allows one- or two dimensional arrays of optical devices (emitters, detectors, modulators, micro electro mechanical systems etc.) to have optical outputs which can be combined, split, routed, and shuffled in an arbitrary manner so that at the output of the stack, signals are output in a specific manner different from the input to the stack.

Figure 10B:
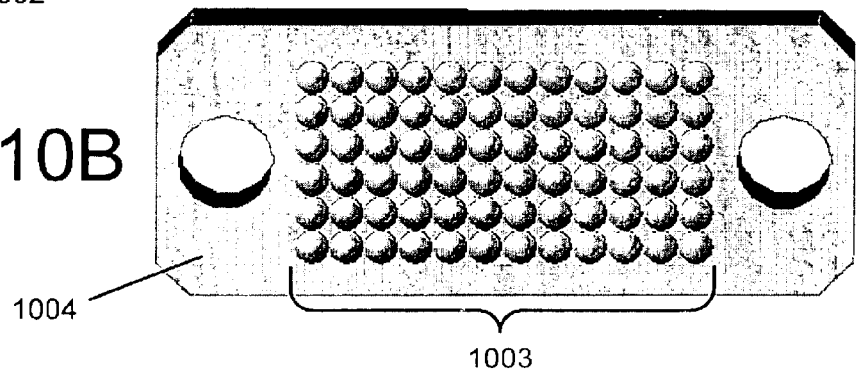
FIG. 10B shows an example high precision piece incorporating microlenses, made using another variant of the technique described herein.
Figure 14:
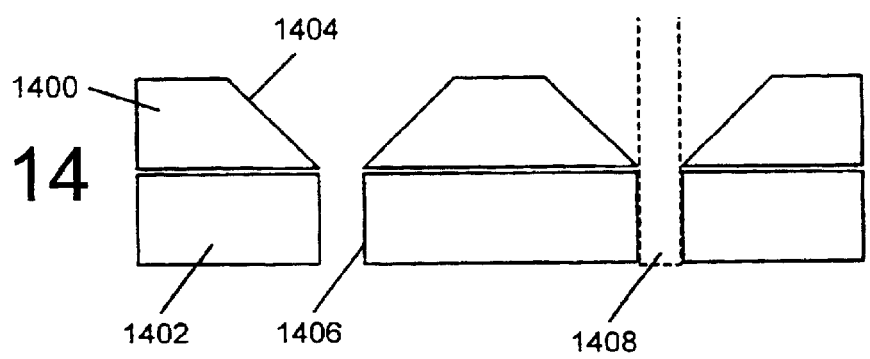
FIG. 14 shows a second approach to ensuring that an angle of insertion is minimized.

In addition, the technique allows for incorporation of other elements, for example, by inserting microlenses 1002 into a high precision piece 1004 to create an array of microlenses (FIG. 10B). This can be done by, for example, depositing microlenses in the tapered holes of high precision pieces such as made in connection with FIG. 13, 14 or 15 or in etched "stepped" holes of two or more different diameters, or dished holes (since, in either case, ease of fiber insertion is not a concern for this piece). Once such a piece is created, it can be integrated with other pieces as desired. Similarly, the approach can be used to incorporate diffraction gratings into a stack or a low precision piece.

The techniques described herein can further be used to create a single, high-density connector to connect fiber riser cables together, instead of through use of huge multi-connector assemblies as is currently done.

In a further variant, by using a high-precision piece made of silicon in a connector used to attach fiber bundles to transceiver modules containing optics attached to semiconductor wafers (e.g. a silicon opto-electronic chip), the thermal coefficient of expansion of the piece in the connector can be readily matched with the coefficient of expansion of the chip in the module. Thus the connection will not degrade appreciably due to temperature fluctuations.

Notably, while some variants of the technique described herein specifically use a combination of high-precision and low precision components, the approach is equally applicable to a single grown, molded, milled, or machined piece that can be processed as either a low-precision, a high precision or combination piece.

Figure 26A:
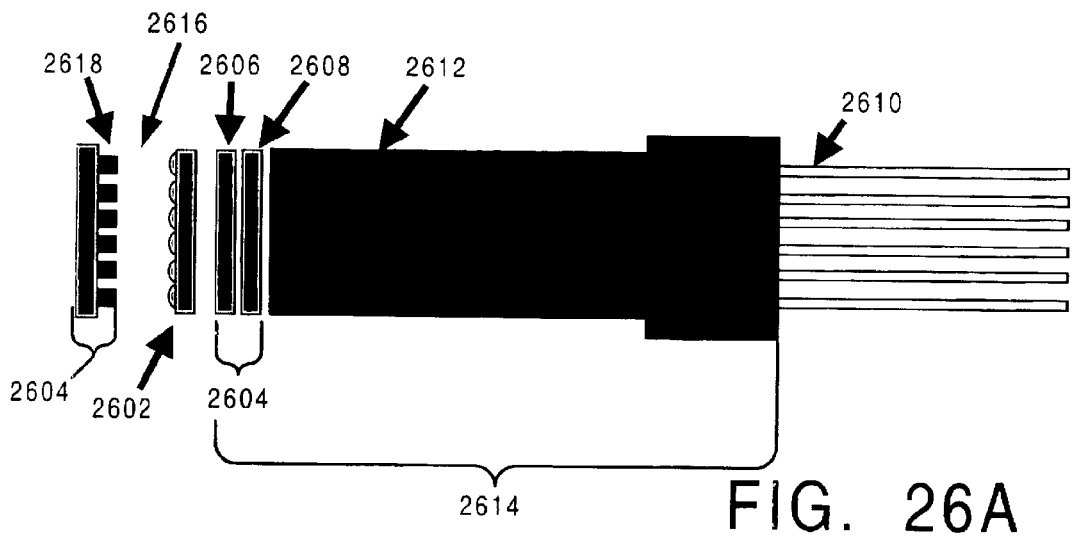
FIG. 26A shows a more complex, combination application of the techniques described herein.
Figure 26B:
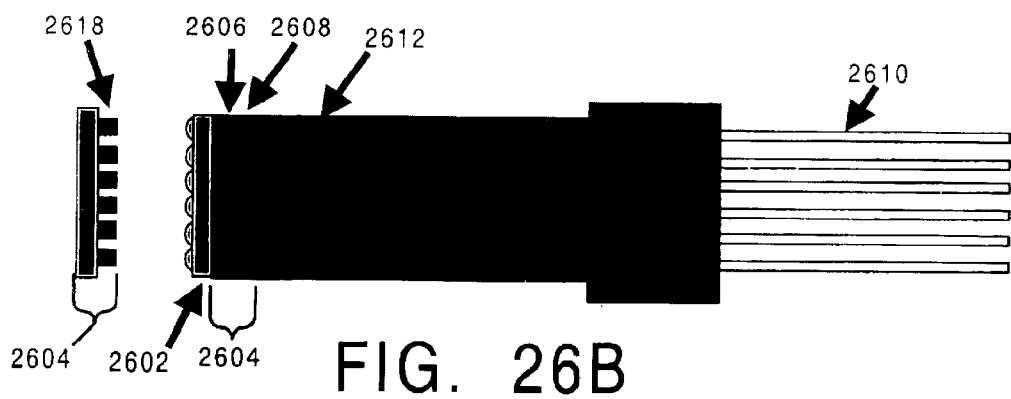
FIG. 26B shows a microlens array stacked with two high precision pieces and a low precision piece to create an ferrule compatible with an MTP, MPO, MPX or SMC style connector.
Figure 26C:
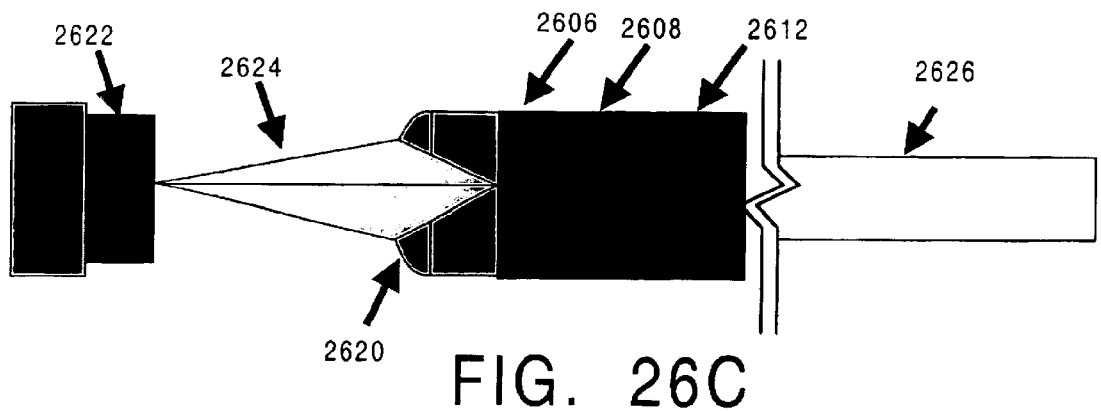
FIG. 26C shows a single optical device focussing light between a device and a single mode fiber using the arrangement of FIGS. 26A and 26B.

FIGS. 26A through 26C show a yet a further, more complex, combination application of the techniques described herein. As shown, a microlens array 2602, such as shown in FIG. 10B, is incorporated as one of the elements in the stack 2604 of high precision pieces 2606, 2608. As shown in FIG. 26A, fibers 2610, in this case single mode fibers, are held by a combination of a low precision piece 2612 and the two high precision pieces 2606, 2608. The microlens array 2602 is stacked with the two high precision pieces and combined with the low precision piece 2612 to create, in this case, a ferrule 2614 compatible with an MTP, MPO, MPX or SMC style connector (FIG. 26B). In this application, the connector is designed to be coupled to an optical device array 2616, for example, an array of transmitters 2618. The microlenses 2620 focus the incident light beam more narrowly so that more accurate and/or efficient coupling between the optical devices and fibers can be obtained.

Advantageously, assuming that the array of devices was created for coupling to multimode fibers of a particular pitch, through use of the ferrule of FIG. 26B, the same array can be coupled to single mode fibers without taking any special action or changing the device array at all. FIG. 26C shows a single optical device 2622 in the array 2618 focussing light 2624 between the device 2622 and a single mode fiber 2626 through use of the arrangement shown in FIGS. 26A and 26B.

Figure 27:
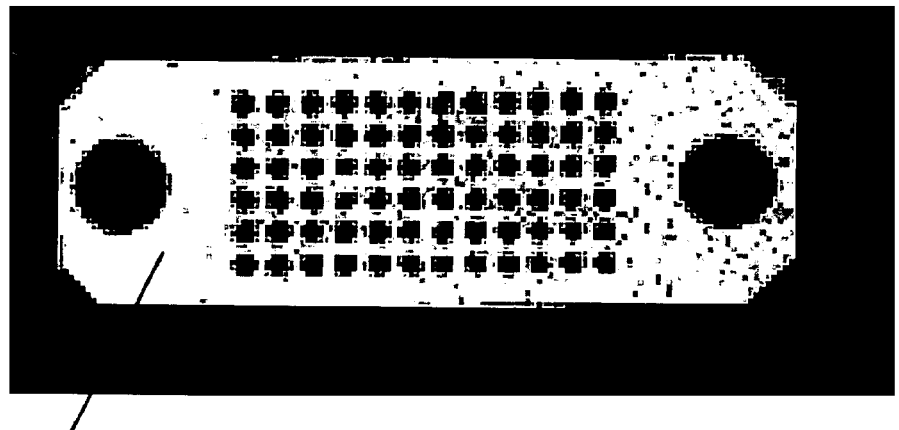
FIG. 27 is a photograph of a high precision piece created according to one variant of the techniques described herein.

FIG. 27 is a photograph of a high precision piece 2700 created as described herein.

Figure 28:
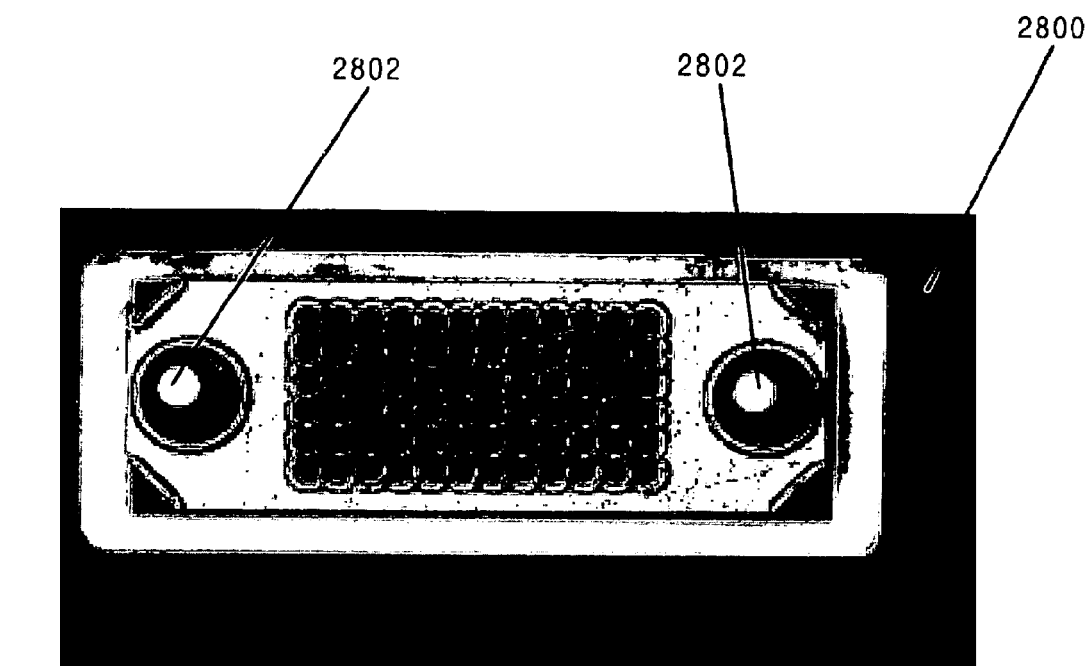
FIG. 28 is a photograph of the piece mounted in a low precision piece as described herein showing the alignment pins.

FIG. 28 is a photograph of the piece 2700 mounted in a low precision piece 2800 as described herein and showing alignment pins 2802 passing through the low precision piece 2800 and the piece 2700.

Figure 29:
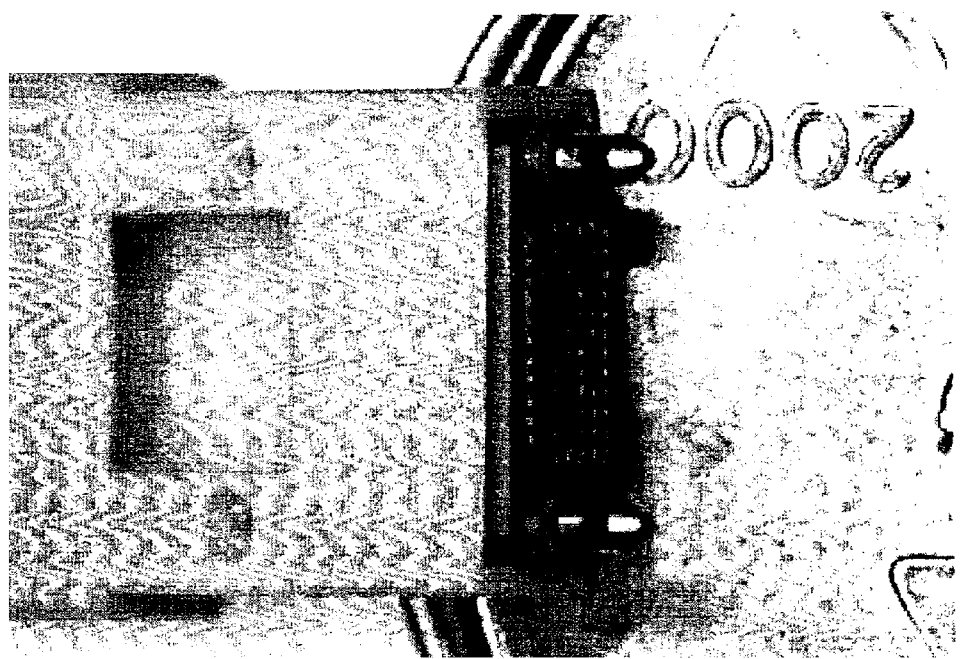
FIG. 29 is a photograph, in ¾ view of a ferrule for use in an MTP connector superimposed against a penny.

FIG. 29 is a photograph, in ¾ view of a ferrule created according to one variant of the invention, for use in an MTP connector and superimposed against a penny for relative sizing.

Figure 30:
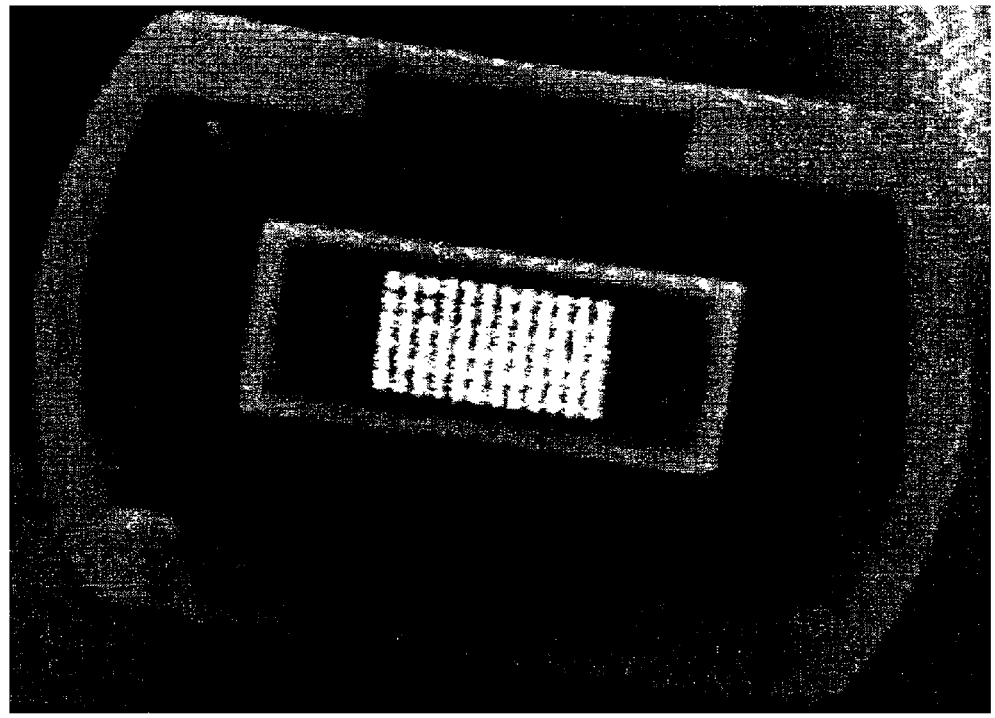
FIG. 30 is a photograph of a fully assembled MTP connector as described herein having 72 light carrying fibers.

FIG. 30 is a photograph of a fully assembled MTP style connector as described herein having at least one high precision piece holding 72 light carrying fibers.

Thus, while we have shown and described various examples employing the invention, it should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments or other combinations of described portions may be available, is not to be considered a disclaimer of those alternate embodiments. It can be appreciated that many of those undescribed embodiments are within the literal scope of the following claims, and others are equivalent.

What is claimed is:

1. An apparatus for use within a commercial fiber optic connector comprising:
   a first high precision slice having multiple holes of a first area and a first alignment opening;
   a second high precision slice having multiple holes of a second area and a second alignment opening;
   the first high precision slice abutting the second high precision slice to form a first unit;
   a third high precision slice having multiple holes and a third alignment opening,
   optical fibers extending between the holes in the first unit and the multiple holes in the third high precision piece,
   a separator, separating the first unit from the third high precision slice,
   the holes of the first high precision slice being arranged relative to the first alignment opening so that, when the second high precision slice and the first high precision slice are juxtaposed with one another and the first alignment opening and the second alignment opening of each are aligned, the holes of the first high precision slice and the holes of the second high precision slice will be offset relative to each other and define openings having areas each less than a smaller of the first area and second area defining the opening and closely constraining the optical fibers inserted therethrough, the optical fibers are constrained by the first unit.

2. The apparatus of claim 1 wherein the third slice comprises silicon wafer and the holes in the third slice are created using an isotropic wet etch process.

3. The apparatus of claim 1 wherein the third slice comprises silicon wafer and the holes in the third slice are created using an anisotropic etch process.

4. The apparatus of claim 1 wherein the holes in the third slice are created using a drilling process.

5. The apparatus of claim 1 wherein the first slice comprises silicon wafer and the holes in the first slice are created using an isotropic wet etch process.

6. The apparatus of claim 5 wherein the isotropic wet etch process is a KOH etch.

7. The apparatus of claim 1 wherein the second slice comprises silicon wafer and the holes in the second slice are created using an anisotropic etch process.

8. The apparatus of claim 7 wherein the anisotropic etch process is a Bosch process.

9. The apparatus of claim 1 where the holes in the second slice are created using a drilling process.

10. An apparatus to constrain optical fibers, for use in commercial fiber optic connectors, comprising:
    a ferrule peripherally dimensioned for housing within the commercial fiber optic connector, the ferrule including
    a) two pieces each cleaved from a silicon wafer having a thickness, each of the pieces having a first side and a second side opposite the first side, and an array of fiber holes, the fiber holes having been formed by
      i) photoresist patterning fiber hole locations on a surface of the silicon wafer,
      ii) performing an etching on the surface of the silicon wafer to create the fiber holes, and
      iii) performing a clean up etching of the holes, and
    b) a separator connecting the two pieces and separating the two pieces from each other by a spacing greater than the thickness, and
    c) optical fibers, within the spacing, connecting fiber holes in one of the two pieces to fiber holes in the other of the two pieces.

11. The apparatus of claim 10 wherein at least some of the optical fibers comprise a single mode optical fiber.

12. The apparatus of claim 11 wherein the fiber holes were further created by orienting the silicon wafer to a particular angular orientation after i) but before ii) and performing ii) with the silicon wafer at the particular orientation so that the fiber holes on one of the two pieces will be offset from a perpendicular to the first side.

13. The apparatus of claim 10 wherein at least some of the optical fibers are multimode optical fibers.

14. The apparatus of claim 10 wherein at least one of the optical fibers is a fused optical fiber.

15. The apparatus of claim 10 wherein the optical fibers are contained within a commercial fiber optic connector.

16. The apparatus of claim 15 wherein the commercial fiber optic connector is one of an MTP, MPO, MPX or SMC connector.

17. A commercial fiber optic connector of a style constructed to accept a ferrule-like unit therein, the commercial fiber optic connector comprising:
    optical fibers, each having a first part and a second part, the first and second parts being separated by lengths,
    a low precision piece having a peripheral shape of a part of the ferrule-like unit,
    two high precision slices each having a surface and fiber holes therein,
    a chamber separating the two high precision slices, and defining a volume therebetween, the optical fibers having their first parts within the fiber holes in one of the two high precision slices and their second parts within the fiber holes in the other of the two high precision slices and at least some of their length within the volume,
    the low precision piece being coupled to the two high precision slices,
    the low precision piece and the two high precision slices collectively forming the ferrule like unit, and
    the ferrule like unit being contained substantially within the connector.

18. The commercial fiber optic connector of claim 17 wherein the style is one of an MTP style, MPO style or MPX style.

19. The commercial fiber optic connector of claim 17, further comprising:
    an alignment piece, contained within the connector housing, and having posts extending through at least one of the low precision piece or a high precision slice.

20. A method of making a fiber optic connector adapted to receive a fiber bearing unit, comprising:
    coupling two high precision pieces, having misaligned holes relative to each other, together and configured to, when misaligned, accept an array of optical fibers inserted therein and hold the fibers therein,
    coupling the at least two high precision pieces and a third high precision piece to a low precision piece to form a unit, the low precision piece separating the at least two high precision pieces from the third high precision piece,
    inserting optical fibers into the unit, and
    housing the unit within a fiber optic connector housing.

21. The method of claim 20 further comprising:
forming the high precision pieces on a common wafer.

22. The method of claim 21 further comprising:
forming the holes by photoresist etching.

23. A method of making a commercial optical connector, the method comprising:
- making a first plate having holes, each larger than a cross sectional area of an optical fiber;
- making a second plate by etching holes each larger than the cross sectional area of the optical fiber;
- inserting the optical fiber in one of the holes in the first plate and one of the holes in the second plate,
- forming a ferrule component by connecting each of the first plate and the second plate to a chamber so that the chamber separates the first plate from the second plate, and
- inserting the ferrule component in a ferrule location of the commercial optical connector.

24. The method of claim 23 further comprising:
inserting the first plate and the second plate onto an alignment pin.

25. The method of claim 23 wherein the making the holes in the first plate comprises making holes of a substantially circular cross section by an etching process.

26. The method of claim 23 wherein the making the holes in the first plat comprises making holes of a substantially oval cross section by an etching process.

27. The method of claim 23 further comprising flowing an epoxy into the chamber.

\* \* \* \* \*

UNITED STATES PATENT AND TRADEMARK OFFICE
CERTIFICATE OF CORRECTION

PATENT NO. : 6,773,166 B2
DATED : August 10, 2004
INVENTOR(S) : John Trezza et al.

It is certified that error appears in the above-identified patent and that said Letters Patent is hereby corrected as shown below:

<u>Column 22,</u>
Line 11, "in the first plat comprises making holes of a substantially" should read -- in the first plate comprises making holes of a substantially --

Signed and Sealed this

Thirtieth Day of November, 2004

JON W. DUDAS
*Director of the United States Patent and Trademark Office*